United States Patent [19]

Ergott, Jr. et al.

[11] Patent Number: 4,965,828
[45] Date of Patent: Oct. 23, 1990

[54] NON-VOLATILE SEMICONDUCTOR MEMORY WITH SCRAM HOLD CYCLE PRIOR TO SCRAM-TO-E²PROM BACKUP TRANSFER

[75] Inventors: Harold L. Ergott, Jr., Fountain Hills; John F. Bruder, Phoenix; Robert E. Peters; Sam L. Rainwater, both of Tempe, all of Ariz.

[73] Assignee: Quadri Corporation, Chandler, Ariz.

[21] Appl. No.: 333,709

[22] Filed: Apr. 5, 1989

[51] Int. Cl.⁵ .................. H04L 9/00; G11B 23/28
[52] U.S. Cl. ........................ 380/50; 380/3; 380/4; 380/49; 365/229; 307/64; 371/14
[58] Field of Search .............. 380/3, 4, 49, 50, 52; 364/483; 365/228, 229; 307/64; 371/14, 66

[56] References Cited

U.S. PATENT DOCUMENTS

| | | | |
|---|---|---|---|
| 3,753,001 | 8/1973 | Hiroshima et al. | 307/10 |
| 3,801,963 | 4/1974 | Chen | 340/172.5 |
| 3,916,390 | 10/1975 | Chang et al. | 340/173 |
| 4,095,046 | 6/1978 | Frutiger et al. | 178/22 |
| 4,096,560 | 6/1978 | Footh | 364/200 |
| 4,159,517 | 6/1979 | Paradine et al. | 364/200 |
| 4,247,913 | 1/1981 | Hiniker | 365/228 |
| 4,327,410 | 4/1982 | Patel et al. | 364/200 |
| 4,348,729 | 9/1982 | Sasayama et al. | 364/431.12 |
| 4,350,844 | 9/1982 | Sturzinger et al. | 178/22.18 |
| 4,375,663 | 3/1983 | Arcara et al. | 364/200 |
| 4,399,524 | 8/1983 | Muguruma et al. | 365/228 X |
| 4,520,458 | 5/1985 | Hattori et al. | 364/900 |
| 4,534,018 | 8/1985 | Eckert et al. | 365/228 |
| 4,591,782 | 5/1986 | Germer | 324/103 |
| 4,612,632 | 9/1986 | Olson | 365/226 |
| 4,638,465 | 1/1987 | Rosini et al. | 365/228 |
| 4,651,307 | 3/1987 | Toumayan et al. | 365/228 X |
| 4,658,093 | 4/1987 | Hellman | 380/25 |
| 4,712,195 | 12/1987 | Finger | 365/226 |
| 4,751,733 | 6/1988 | Delayaye et al. | 380/42 |

FOREIGN PATENT DOCUMENTS

| | | | |
|---|---|---|---|
| 3147077 | 6/1983 | Fed. Rep. of Germany | 365/228 |
| 3150080 | 7/1983 | Fed. Rep. of Germany | |

Primary Examiner—Thomas H. Tarcza
Assistant Examiner—Linda J. Wallace
Attorney, Agent, or Firm—Cahill, Sutton & Thomas

[57] ABSTRACT

A non-volatile memory system includes an SRAM and a backup store of E²PROMs. In the event of a short duration power interruption, the memory system enters a hold mode in which data maintenance power is supplied to the SRAM by discharging a backup capacitor, and accessing of the SRAM by a host computer is halted. If the backup capacitor voltage does not fall below a threshold before power is restored, the hold mode is terminated and accessing by the host computer continues. If the backup capacitor voltage falls below the threshold, operating power is supplied to the SRAM, E²PROM, and associated circuitry to download all data and row and column parity data into the E²PROM by further discharging of the backup capacitor. Row parity and column parity information are accumulated by a bit-per-chip accumulation technique that allows convenient error correction on a "per chip" basis. Data is encrypted and decrypted on the basis of a fully erasable magnetic key.

24 Claims, 5 Drawing Sheets

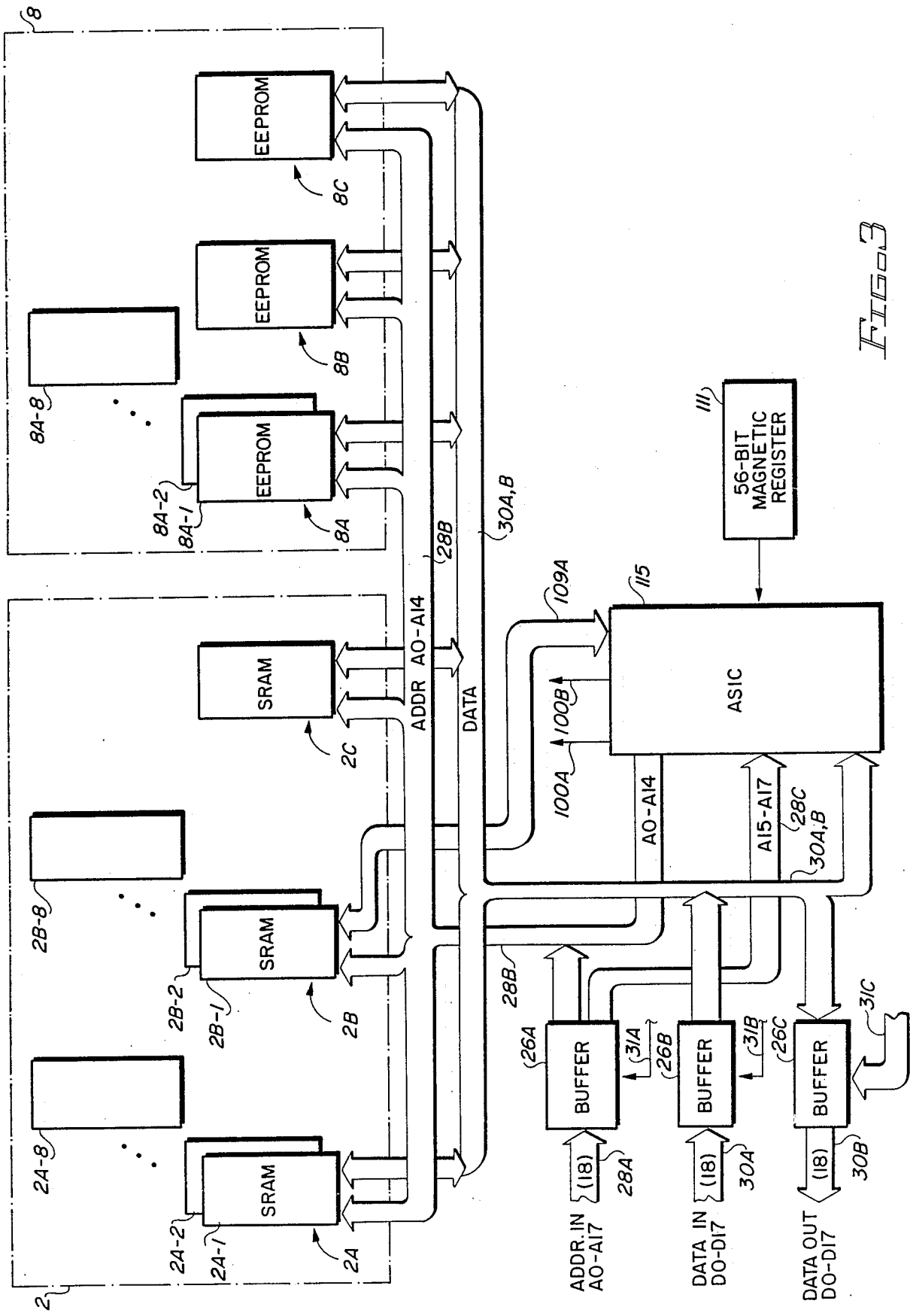

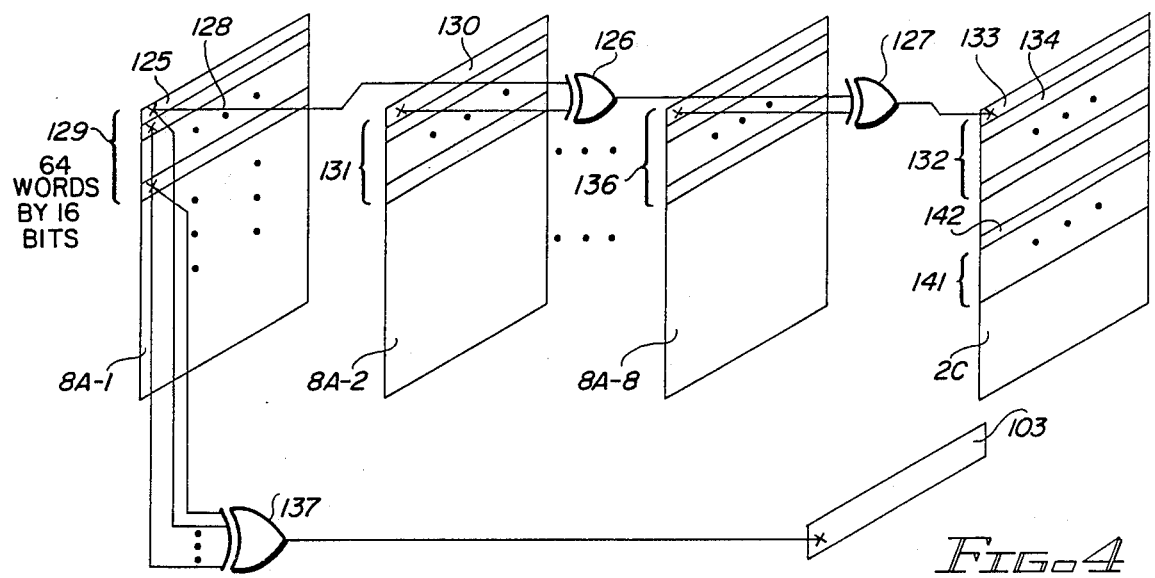
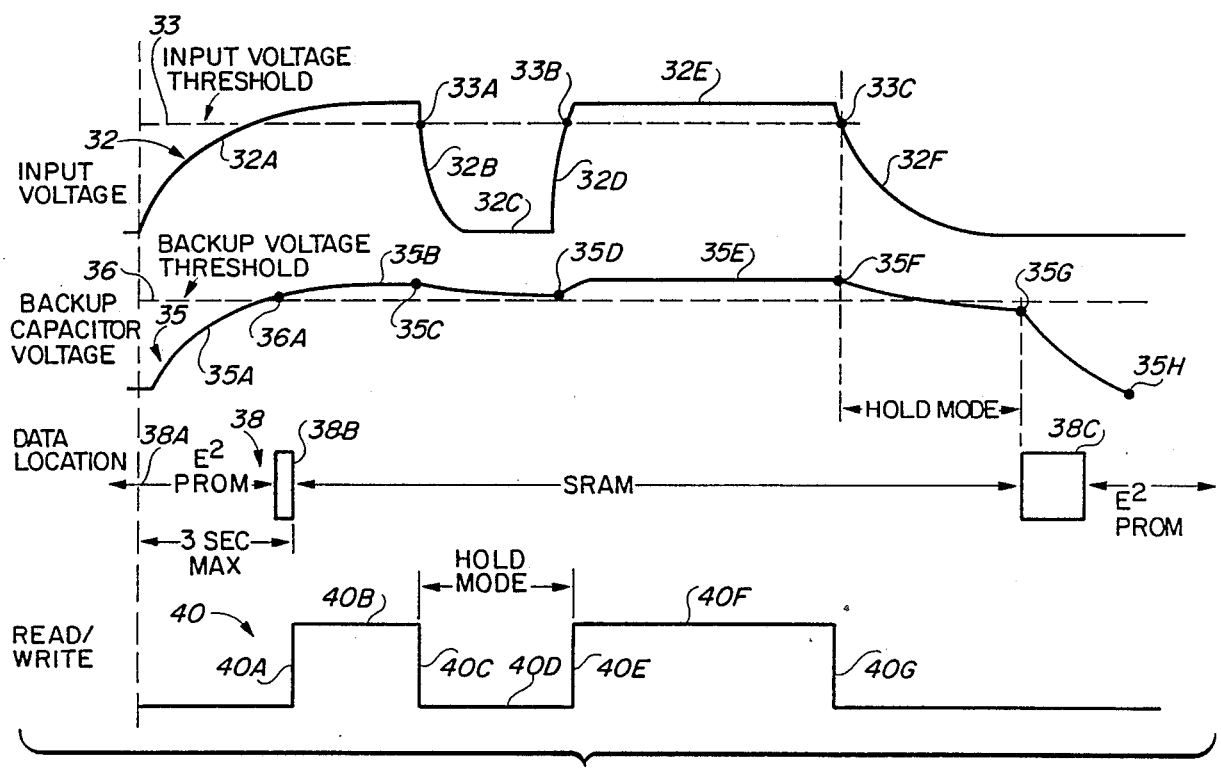

NON-VOLATILE SEMICONDUCTOR MEMORY WITH SCRAM HOLD CYCLE PRIOR TO SCRAM-TO-E²PROM BACKUP TRANSFER

BACKGROUND OF THE INVENTION

The invention relates to non-volatile semiconductor memory systems including a volatile high speed SRAM (static random access memory), a non-volatile E²PROM (electrically eraseable programmable read only memory) backup memory, and circuitry for transferring the contents of the SRAM to the E²PROM in response to onset of a power interruption or failure.

In the past, core memory systems have been widely used where non-volatile RAMs were required, since the ferrite cores used therein are inherently non-volatile.

The technology for semiconductor memories has advanced rapidly, making semiconductor memories faster, more reliable, and less costly than core memories. However, in applications where non-volatile memory is required, the problems of volatility of available semiconductor RAM storage cells, the slow write speed and wear out factor of E²PROM circuits that might otherwise be used as backup memories, the large amounts of power required to sustain data storage in available semiconductor RAMs and to effectuate transfer of data from such RAMs to E²PROMs, and the difficulties of storing enough energy in a backup capacitor to effectuate RAM-to-E²PROM downloading have combined to prevent semiconductor memories from being widely used where non-volatile memory performance is required.

U.S. Pat. No. 4,591,782 (Germer, issued May 27, 1986) describes a non-volatile memory incorporated into an electric meter in which volatile semiconductor memory is used in conjunction with a backup capacitor and control circuitry. The control circuitry senses the onset of a power failure. The backup capacitor supplies power to effectuate transfer of some of the data from the volatile semiconductor memory to a non-volatile E²PROM backup memory. The Germer patent deals with the problem of "wear out" of the E²PROMs by not immediately transferring data from the non-volatile storage to the E²PROMs and instead waiting a fixed amount of time until a preset counter "times out". The backup capacitor has sufficient energy storage to maintain power to critical circuits for a long enough period after power failure to permit transfer of the entire contents of the volatile RAM to the non-volatile E²PROM. When a momentary power outage causes the voltage of an unregulated DC power supply to fall below a first threshold, a counter is started, but normal operation of the system continues. If the unregulated DC voltage does not rise above a second threshold that is slightly higher than the first threshold before the counter times out, a processor initiates transfer of data from the voltatile RAM to the non-volatile E²PROM. If the regulated supply voltage falls below a third threshold at which the processor is no longer able to reliably maintain its operating conditions, a reset signal is produced to reset the processor. The third threshold is set low enough that all data is safely transferred from the volatile RAM to the non-volatile E²PROM before the reset signal is generated.

There are several disadvantages of the Germer approach. The requirement of a backup timer and the circuitry using the three thresholds increases overall complexity and cost of the Germer system. The timeout period of the backup timer is constant, so if the current drawn by the E²PROM and associated circuitry increases with age or if the storage capacity of the backup capacitors is degraded the timeout period of the timer may be inadequate and data may be lost. The constant duration timeout period does not permit maximum useage of the storage capacity of the backup capacitor, so unnecessary downloading and uploading may occur for short duration power losses even though the backup supply has the capacity to maintain integrity of data in the volatile RAM for the duration of the power loss.

There exist devices called NOVORAMs that combine the functions of an SRAM and an E²PROM on a single silicon chip. Data from the SRAM portion may be stored in the non-volatile E²PROM portion prior to power loss. However, if power is removed prior to completion of data transfer from the SRAM portion to the E²PROM portion, the correctness of data in the E²PROM is indeterminate.

It has been a common practice to encrypt data before storing it. Government approved encryption algorithms using a "key word" often are used. The encrypted data usually is stored in magnetic media. If there is a need to destroy the encrypted data, all of it must be erased from the magnetic media. In some cases, the amount of time required to erase the encrypted data from the magnetic media may be unacceptable.

There is an unmet need for a non-volatile memory system which includes a volatile semiconductor RAM and a non-volatile backup memory to which data in the RAM is downloaded during power interruptions and from which data is uploaded into the RAM after power interruptions, wherein the number of downloading operations is minimized in accordance with the duration of power interruption, condition of a backup power source, and current drain of the entire memory system.

SUMMARY OF THE INVENTION

Accordingly, it is an object of the invention to provide an economical non-volatile semiconductor memory system that provides substantially faster performance, utilizes substantially less power, and occupies substantially less space than the closest prior non-volatile core memory systems.

It is another object of the invention to provide reliable data retention in a high speed semiconductor random access read/write memory system in an environment in which intermittent short duration power failures are likely.

It is another object of the invention to provide minimum degradation of an E²PROM backup memory for a high speed semiconductor SRAM.

It is another object of the invention to provide minimum duration of memory useage interruptions caused by short duration power interruptions, such as power interruptions caused by high electrical noise on an input power line.

It is another object of the invention to provide an E²PROM based backup system for a volatile RAM wherein downloading operations are avoided unless a backup power source is unable to safely supply enough power to effectuate such downloading.

It is another object of the invention to provide a secure non-volatile memory system in which data stored in a non-volatile backup memory during a power interruption can be, in effect, very rapidly erased or made undecipherable.

Briefly described, and in accordance with one embodiment thereof, the invention provides a system that utilizes a volatile SRAM and a non-volatile backup store implemented by means of E²PROMs in which data is transferred from the SRAMs to the E²PROMs when the power is turned off or interrupted by using high voltage energy stored in a backup capacitor to provide operating power for at least a long enough period of time to effectuate reliable transfer of data from the SRAM to the E²PROM. Any drop in input power below a first threshold causes operation of the SRAM to be halted as soon as the present cycle of operation is finished. An internal power supply voltage applied to the SRAMs is reduced to a minimal maintenance level (e.g., 2 volts), and power to certain other circuitry in the system is cut off. The energy stored in the backup capacitor is monitored, and at a time when just enough energy plus a safety factor remains to download all of the data from the SRAM to the E²PROM, a controller effectuates downloading of all the data in the SRAM to the E²PROM backup memory. A unique row-column parity accumulation and check system "scrubs" errors from data read out of the E²PROM during an upload of data from the E²PROM to the SRAM.

More specifically, in the described embodiment of the invention, the backup capacitor voltage is charged up to and maintained at a selected level of approximately 100 volts while the external power supply is applied to the non-volatile memory system. Accessing of the SRAM by a host computer is halted while the backup capacitor is discharged to supply energy to maintain the reduced data maintenance voltage across the SRAM if the external supply voltage falls below the first threshold. Accessing of the SRAM by the host computer is resumed if the external power supply voltage rises above the first threshold before the backup capacitor voltage falls below a second threshold of approximately 85 volts. If the backup capacitor voltage falls below the second threshold, all of the data in the SRAM is downloaded to the E²PROM while the backup capacitor is discharged to supply energy to maintain the internal power supply voltage at 5 volts during the entire downloading. The backup capacitor stores enough energy when the backup capacitor voltage is at 100 volts to both allow the halted condition to continue for at least one minute and also effectuate complete downloading of data from the SRAM to the E²PROM. Power is removed from the E²PROM during read or write memory accesses by the host computer and also when the 2 volt data maintenance voltage is being maintained on the SRAM. During downloading, row parity information and column parity information are accumulated and stored in the E²PROM along with the data from the SRAM. The non-volatile memory system includes a plurality of integrated circuit SRAMs and a plurality of integrated circuit E²PROMs, each of which is subdivided into a plurality of subsections. The downloading operation includes reading words in a first subsection of a first integrated circuit SRAM and transferring the read data into a corresponding subsection of a first integrated circuit E²PROM, and also transferring the read data into corresponding words of a row parity accumulator and also into a column parity accumulator. The words in a first subsection of a second integrated circuit SRAM then are read and exclusively ORed with corresponding words of the row parity accumulator and the results replace corresponding words of the row parity accumulator. Each word of the first subsection also is exclusively ORed with the word in the column parity accumulator, and the result replaces the same prior word in the column parity accumulator. The contents of the row parity accumulator and the column parity accumulator then are transferred into a scratch pad section of the E²PROM. The uploading operation includes reading the words in a first subsection of the first integrated circuit E²PROM and transferring the read data into the first subsection of the SRAM, and also transferring the read data into corresponding words of the row parity accumulator and the column parity accumulator. The words in a first subsection of a second integrated circuit E²PROM are read and exclusively ORed with the corresponding words of the row parity accumulator and the result replaces the same word of the row parity accumulator. The words in the first subsection of the second integrated circuit E²PROM also are exclusively ORed with the contents of the column parity accumulator and the result replaces the contents of the column parity accumulator. The row parity data and the column parity data are compared with previously stored row parity data and column parity data written into the E²PROM during a prior downloading operation. An error pattern is produced if a mismatch occurs, and data written into the SRAM is exclusively ORed with the error pattern to correct the data. The corrected data then is written into the SRAM.

BRIEF DESCRIPTION OF THE DRAWINGS

FIG. 3 is a detailed block diagram useful in describing the control logic of FIG. 1.

FIG. 4 is a diagram useful in explaining the "bit per chip" row parity and column parity accumulation techniques of the present invention.

FIG. 5 is a timing diagram useful in describing the operation of the system of FIG. 1.

DETAILED DESCRIPTION OF THE PREFERRED EMBODIMENT

Figure 1:
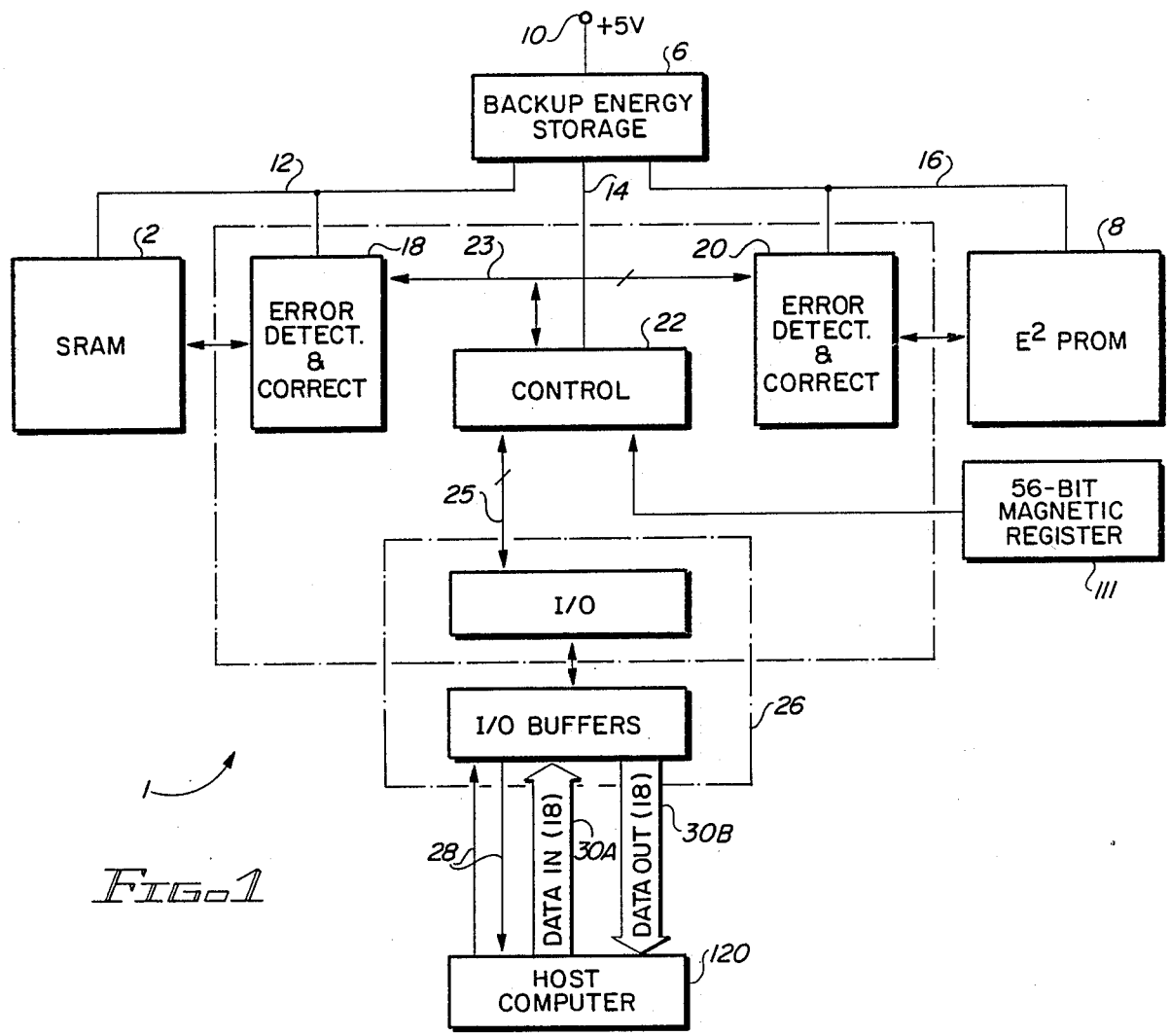
FIG. 1 is a block diagram of the non-volatile semiconductor memory system of the present invention.

Referring to FIG. 1, memory system 1 includes a volatile RAM (Random Access Memory) section 2, which in the presently preferred embodiment of the invention includes CMOS static RAM cells. The SRAM cells preferably operate reliably to retain data with power supply voltages as low as 2 volts, and operate at normal speeds with $V_{DD}$, equal to +5 volts. SRAM 2 is organized as 256k (actually 262,144) words each including 16 data bits and 6 bits of Hamming code data.

SRAM 2 is accessed in response to control circuitry 22 and in conjunction with operation of error detection and correction circuitry 18. Control circuitry 22 generates addresses on bus 23 for accessing SRAM 2 and E²PROM 8. Bus 23 also includes data conductors, a read conductor, and a write conductor. Bus 23 also includes 6 Hamming code conductors and 2 parity bit conductors. Control circuitry 22 is coupled by bus 25 to data input/output circuitry 26, which receives address and control signals on conductors 28. Eighteen Data In conductors 30A and eighteen Data Out conductors 30B are connected to input/output unit 26.

Figure 2:
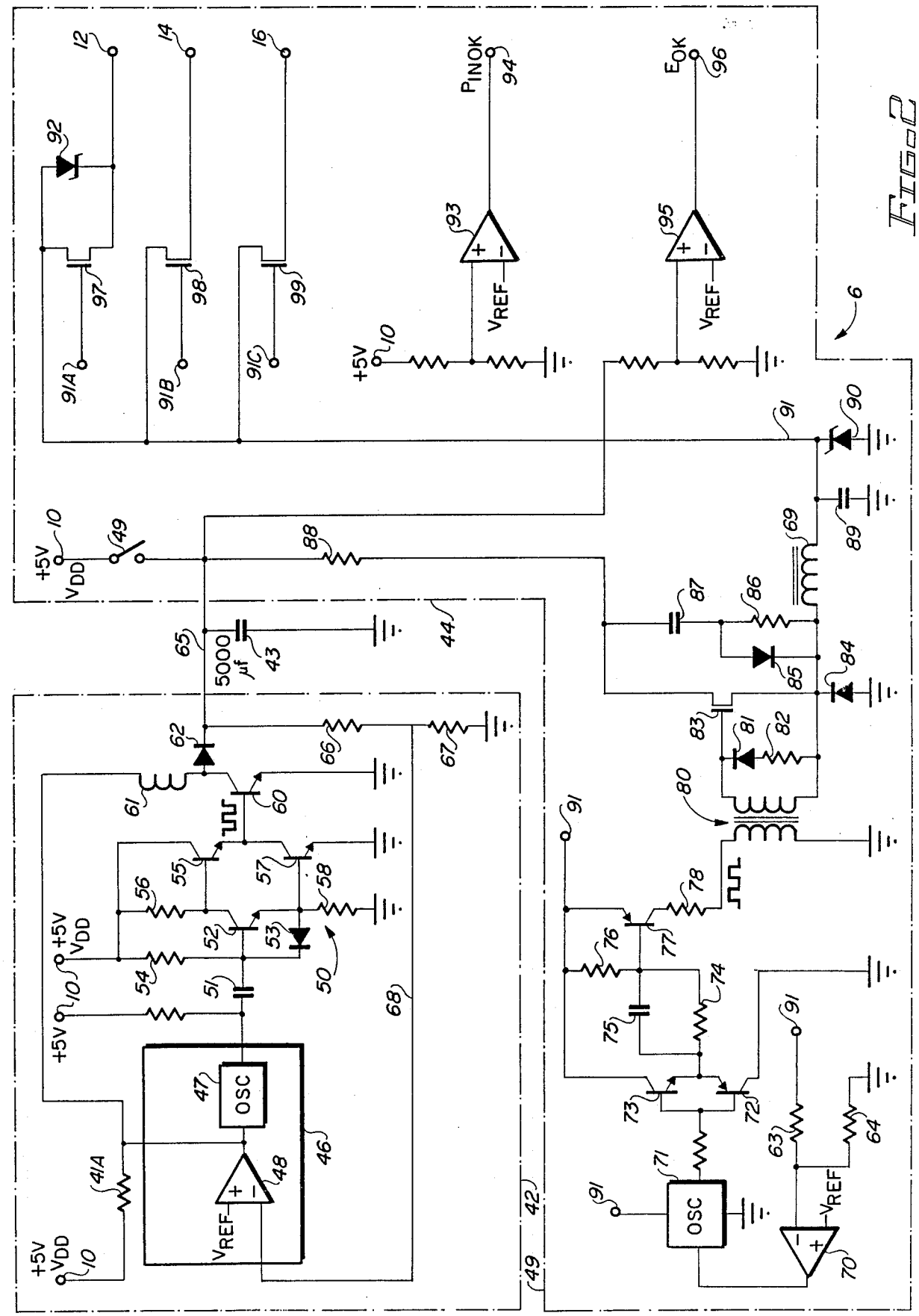
FIG. 2 is a schematic circuit diagram of the backup storage capacitor, voltage up converter, and voltage down converter circuitry which cooperate to effectuate transfer of data from the SRAM to the E²PROM in the event of a power interruption of at least a minimum specified duration.

Power is supplied to SRAM 2 via a power bus from an energy storage circuit 6 which contains circuitry shown in FIG. 2 to supply a steady internal input power during normal operating conditions and backup power during short duration power interruptions. External power bus 10 supplies input power at, for example, +5 volts, to energy storage circuit 6.

Non-volatile memory system 1 also includes an $E^2$PROM 8. Bus 23 includes conductors coupled to error detection and correction circuitry 20 and control circuit 22. Error detection circuitry 18 includes standard Hamming code double bit detection, single bit correction circuitry to "scrub" errors from data read out of SRAM 2. Error detection and correction circuitry 20 includes row and column parity circuitry and correction circuitry which efficiently "scrubs" errors from data read out of $E^2$PROM 8.

The non-volatile memory system 1 of FIG. 1 normally operates as an SRAM when the main power on conductor 10 is present. If there is a power interruption or failure, non-volatile energy system 1 acts as a backup memory that contains all of the data in SRAM 2 immediately before the interruption of input power 10.

If the input power 10 falls below specification limits (typically 10% below a nominal $V_{DD}$ voltage of 5 volts), the system 1 goes into a "hold mode", reducing the sustaining power to SRAM 2 to approximately 2 volts and cutting off power via conductors 14 to control circuitry 22, input/output circuitry 26, and error correction and detection circuitry 18 and 20. If the input power 10 does not then increase to a minimum specification level within a "hold" period which preferably is at least approximately one minute, control circuitry 22 (which along with SRAM 2 is being sustained by a backup capacitor in energy storage circuit 6) initiates downloading of data from SRAM 2 to $E^2$PROM 8 and applies the internal supply voltage to the components as needed to effectuate the downloading.

More specifically, downloading is initiated if the voltage stored on the backup capacitor falls below the predefined threshold, typically about 80% below the nominal backup energy level. In this event, the controller circuit 22 applies full power from the energy storage circuit 6 to all or nearly all of the circuitry in FIG. 1 to effectuate downloading of the entire contents of SRAM 2 into $E^2$PROM 8. Controller circuit 22 controls the sequence of all transfers of data between SRAM 2 and $E^2$PROM 8. Controller circuit 22 also controls all I/O functions and built-in self test and housekeeping functions.

The overall operation of non-volatile memory 1 can be more thoroughly understood by referring to the timing diagram of FIG. 5. In FIG. 5, numeral 32 designates an example of a waveform of the input voltage carried by conductor 10. Dotted line 33 represents a minimum input voltage threshold. Input power waveform 32 rises from an initial zero level up to a constant operating level, as indicated by numeral 32A. Data in $E^2$PROM 8 then is "uploaded" into SRAM 2 during the interval 38B in the "Data Location" graph in FIG. 5.

In the example of FIG. 5, the input voltage 10 then falls below the input voltage threshold at point 33A, as indicated by section 32B of waveform 32. After being below the input voltage threshold 33 for a short period of time, which should be at least about one minute, the input voltage rises as indicated by numeral 32D to level 32E, crossing the input voltage threshold at point 33B and remaining at +5 volts for an indefinite period of time. Then the input voltage falls below the input voltage threshold at point 33C and remains low for an indefinite time, as indicated by numeral 32F.

In accordance with the present invention, the duration of section 32C of input voltage waveform 32 is short enough that non-volatile memory system 1 goes into a "hold mode", which is a low power data maintenance mode, after finishing the present read or write cycle. However, the data of SRAM 2 is not downloaded to $E^2$PROM 8 unless the backup voltage waveform 35 falls below a "backup voltage threshold" designated by dotted line 36 for more than the minimum hold time.

The above mentioned backup voltage waveform 35 represents the voltage stored on backup capacitor 43 of FIG. 2 as a result of the input power interruptions shown in input voltage waveform 32. More specifically, input voltage waveform 32 causes backup voltage waveform 35 to rise as indicated by numeral 35A, crossing the backup voltage threshold 36 at point 36A and then leveling off as indicated by numeral 35B. The interruption of input power designated by section 32B of input voltage waveform 32 causes a very slow decay of backup voltage waveform 35 between points 35C and 35D. However, backup voltage waveform 35 does not fall below backup voltage threshold 36. When the input voltage waveform 32 then rises as indicated by numeral 32D, backup voltage waveform 35 rises from point 35D to its normal level 35E However, when input voltage waveform 32 is later interrupted as indicated by numeral 32F, backup voltage waveform 35 slowly decays from point 35F to the backup voltage threshold 36, as indicated at point 35G. This initiates downloading of data from SRAM 2 to $E^2$PROM 8, resulting in the further decay of backup voltage 35 between points 35G and 35H.

Data Location graph 38 in FIG. 5 indicates the time intervals in which data is stored in the $E^2$PROM 8 and SRAM 2, uploaded from $E^2$PROM 8 to SRAM 2, and downloaded from to SRAM 2 to $E^2$PROM 8. When both input voltage waveform 32 and backup voltage waveform 35 are above their respective thresholds 33 and 36 during initial powering up of non-volatile memory 1, the read/write waveform 40 is at a low level. The powering up operation typically takes approximately 3 seconds. Interval 38B designates the time during which data is being uploaded from $E^2$PROM 8 to SRAM 2, and typically is approximately 250 milliseconds. Once the transfer is complete, then read/write waveform 40 undergoes transition 40A to level 40B. While read/write waveform 40 is at level 40B, a host computer 120 (FIG. 3) can perform ordinary read and write accesses to SRAM 2. Meanwhile, $E^2$PROM 8 and its associated row and column parity circuitry 20 are powered down by control unit 101 of FIG. 3A.

FIG. 2 shows energy storage circuitry 6, which includes a voltage up converter 42 that performs the function of boosting the external 5 volt power supply voltage on conductor 10 to charge up a 1,000 to 5,000 microfarad backup capacitor 43 to approximately 100 volts to provide a backup voltage on backup capacitor terminal 65 to power the non-volatile memory system 1.

The 100 volts produced on conductor 65 by backup capacitor 43 when it is fully charged then is converted back down to the internal 5 volt supply voltage on conductor 91 whenever the external 5 volt level on conductor 10 is interrupted, by slowly discharging the energy stored in backup capacitor 43. Control circuit 101 (FIG. 3A) supplies separate control voltages to conductors 91A, 91B, and 91C to distribute the internal 5 volt supply voltage on conductor 91 to conductors 12, 14, and 16, respectively, by selectively turning on MOSFETs 97, 98, and 99. If MOSFET 97 is turned off, a three volt zener diode 92 maintains conductor 12 at 2 volts to provide standby power to SRAM 2. At this low voltage, all data is maintained in SRAM 2 in which the total current drawn by SRAM 2 is reduced to only about a miliampere.

Voltage up converter 42 includes a regulator circuit 46, which may be implemented by means of a Motorola "Universal Switching Regulator Subsystem", part number UA78S40. Oscillator 46 contains a comparator 48 and an oscillator 47. The output of oscillator 47 is connected to a pullup resistor and a coupling capacitor 51 and to the input of an amplifier. The amplifier includes NPN transistors 52, 55, and 57, diode 53, and resistors 54, 56, and 58. This amplifier provides a 6-to-1 duty cycle pulse signal to the base of NPN transistor 60, producing current to charge inductor 61. When the transistor 60 is turned off, a back emf is generated across inductor 61, forward biasing diode 62. This causes the current in inductor 61 to charge up capacitor 43. This operation continues with the same duty cycle until the voltage on conductor 65 reaches approximately 100 volts. The current flowing through inductor 61 also flows through a 0.1 ohm resistor 41A, the upper terminal of which is connected to +5 volt conductor 10. The other terminal of resistor 41A is connected to inductor 61 and a control input of oscillator 47. Resistor 41A prevents excessive current from flowing through inductor 61 and transistor 60. When the backup capacitor voltage 65 has been charged to approximately 100 volts, a voltage divider circuit including resistors 66 and 67 produces a voltage that exceeds a reference voltage $V_{REF}$ applied to the non-inverting input of comparator 48. This stops oscillator 47 until the voltage on conductor 68 falls below $V_{REF}$, effectively stretching out the duty cycle of the charging of backup capacitor 43.

It should be noted that switch 49 initially is momentarily closed, charging conductor 91 to 5 volts, and thereby providing a 5 volt internal "jump start" supply voltage to all of the circuits in voltage down converter circuit 44. Voltage down converter circuit 44 includes an oscillator 71 that produces a square wave output that is amplified and shaped by an amplifier including transistors 72, 73, and 77. This amplifier also includes resistors 74 and 76 and capacitor 75, and produces a square wave current pulse through the primary winding of transformer 80. The secondary winding of transformer 80 is connected between the gate and source of a MOSFET 83. The source of MOSFET 83 is connected to the cathode of a diode 84, the anode of which is connected to ground. The secondary winding of transformer 80 produces a voltage pulse that turns MOSFET 83 on, causing current to flow from backup capacitor 43 through resistor 88, MOSFET 83, and inductor 69, charging up capacitor 89. When MOSFET 83 is turned off, a back emf across inductor 69 causes the induction current to continue flowing, forward biasing "catch" diode 84 and further charging up capacitor 89 and conductor 91.

When the voltage on conductor 91 reaches 5 volts, a resistive divider circuit including resistors 63 and 64 causes the voltage on the inverting input of comparator 70 to exceed a reference voltage $V_{REF}$ applied to the non-inverting terminal thereof, halting oscillator 71. Backup capacitor 43 thus is gradually discharged as needed to maintain 5 volts on internal 5 volt conductor 91.

Comparator 93 generates a "Input Power Okay" signal $\overline{P_{INOK}}$ on conductor 94 by sensing the input supply voltage on conductor 10 by means of a resistive divider circuit that applies a voltage to the non-inverting input of comparator 93. When $V_{DD}$ is less then +4.5 volts, $\overline{P_{INOK}}$ goes from a "1" to a "0", initiating the above described "hold mode".

When the backup voltage on conductor 65 is less than about 85% of its usual voltage of 100 volts, this causes a voltage divider to apply a voltage less than $V_{REF}$ to the non-inverting input of comparator 95, so that an "Energy Okay" signal $E_{OK}$ on conductor 96 goes from a "1" to a "0", initiating the downloading of data from SRAM 2 to E$^2$PROM 8.

FIG. 3 illustrates the organization of SRAM 2, E$^2$PROM 8, and ASIC (Application Specific Integrated Circuit) device 115 that includes control circuit 22, Hamming code error detection and correction circuitry 18, row and column parity error detection and correction circuitry 20, and part of input/output circuit 26. ASIC 115 can be an XC3090 programmable logic gate array manufactured by XILINK. It can be programmed to a wide variety of configurations to establish various input/output formats that might be desirable for input-/output circuitry 26.

A 56 bit magnetic register 111 constitutes a "secure key" which is a completely eraseable 56 bit code that is read as a "seed" into an encryption/decryption circuit 112 (FIG. 3A) in ASIC 115 to automatically encrypt data being downloaded from SRAM 2 to E$^2$PROM 8 and automatically decrypt seed data when it is being uploaded from E$^2$PROM 8 to SRAM 2. The 56 bit magnetic register, which can be fabricated of ferrite memory cores, can be erased and reset to contain a different "security key" in such a manner that the original key cannot be recovered, at least not at the present state-of-the-art.

As those skilled in the art know, a fast, reliable erase of certain stored data may be required. It is known that E$^2$PROMs must be rewritten several times in order to reliably erase all evidence of the previously stored data. It is also known that E$^2$PROMs require very long write cycles.

Therefore, there is a need for a much faster, more reliable means of effectively erasing data stored in an E$^2$PROM. The above described system allows an "effective erasing" of the contents of the E$^2$PROM so that the previously stored data becomes undecipherable in an extremely fast manner by simply erasing the contents of the magnetic register 111, which can be accomplished in about 10 microseconds. It also is known that without a secure key, the encrypted data that might be otherwise recovered from E$^2$PROM 8 cannot, as a practical matter, be deciphered, and hence can be "declassified", whereas, certain data that might be stored in non-volatile memory system 1 might otherwise have to be treated as "classified" or secret.

As shown in FIG. 3, SRAM 2 includes sections 2A-1, 2A-2 . . . 2A-8, each of which is a 32,768 word (i.e., 32k) by 16 bit CMOS SRAM, such as an IDT71256L85LB, manufactured by Integrated Device Technology Corp., having its address inputs connected to address bus 28B. The data terminals of each of SRAMs 2A-1 . . . 2A-8 are connected to internal data bus 30A,B. A similar group of eight CMOS SRAMs 2B-1 . . . 2B-8 having address and data terminals connected to address bus 28B and the internal data bus 30A,B also is composed of identical 32k by 8 CMOS SRAMs; this group of SRAMs is used to store Hamming code data. Finally, SRAM 2 also includes an identical 32k word by 16 CMOS SRAM scratch pad memory 2C having its data terminals and address terminals connected to address bus 28B and the data bus 30A,B, respectively. The address terminals of the Hamming code data SRAMS 2B-1 . . . 2B-8 are connected by conductors 109A to ASIC 115.

Address buffer 26A buffers the 18 bit external address bus conductors 28A from the various internal address bus conductors 28B and 28C. Data buffers 26B and 26C buffer the 18 external Data In conductors 30A and the 18 external Data Out conductors 30B from the internal data bus conductors 30A,B.

$E^2$PROM 8 includes sections 8A-1 . . . 8A-8 organized identically (32k words by 16 bits) to data section 2A-1 . . . 2A-8 of SRAM 2. The address and data terminals of the $E^2$PROMs 8A-1 through 8A-8 are connected to the address bus conductors 28B and the data bus conductors 30A,B, respectively. $E^2$PROM 8 also includes an identical 32k word by 16 bit row parity memory 8B having its address and data conductors connected to address bus 28B and data bus 30A,B. Column parity and correction data and maintenance data section 8C of $E^2$PROM 8 also has its address and data terminals connected to address bus 28B and data bus 30A,B.

Figure 3A:
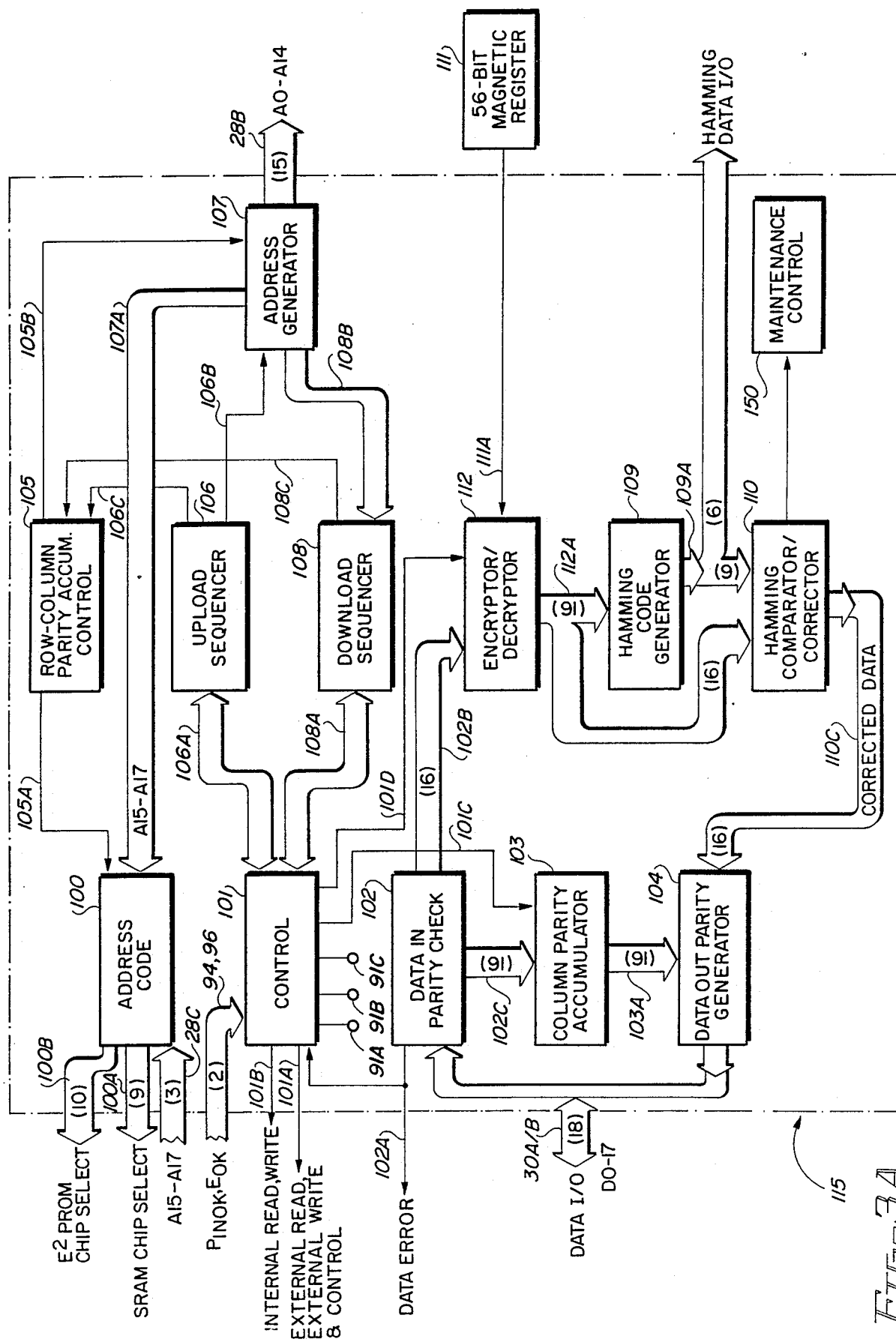
FIG. 3A is a detailed block diagram slowing an implementation of the ASIC (application specific integrated circuit) of FIG. 3.

FIG. 3A shows a block diagram representing the functional blocks "programmed" into ASIC 115 in order to accomplish the control, Hamming code generation, row and column parity generation, and checking functions needed to implement the error detection and correction circuits 18 and 20 of FIG. 1.

Address decode circuit 100 receives as inputs 28C the three external higher order addresses A15, A16, and A17 of address bus 28B. Address decode circuit 100 also receives address inputs 107A (A15–A17) produced by address generation circuit 107 in response to either upload sequence circuit 106 or download sequence circuit 10B. Address decode circuit 100 generates nine SRAM chip select conductors 100A and ten $E^2$PROM chip select conductors 100B to effectuate the necessary chip select functions for downloading SRAM 2 into $E^2$PROM 8, uploading $E^2$PROM 8 into SRAM 2, and accessing of SRAM 2 by a host computer 120 via the input/output circuitry 26 of FIG. 1.

Control circuit 101 receives $\overline{P}_{INOK}$ and $\overline{E}_{OK}$ on conductors 94 and 96, upload control signals 106A from upload sequencing circuit 106, and download control signals 108A from download sequencing circuit 108. Download sequencer circuit 10B is an ordinary "state machine" circuit that receives control inputs 108A indicating that the input power has fallen below threshold 33 and that the backup capacitor voltage has fallen below threshold 36 (FIG. 5). By communicating back to control circuit 101 and address generator 107, data is transferred from the SRAM 2 to $E^2$PROM 8 at the same time that row/column parity data is accumulated. At the completion of a 64 word transfer, the row/column parity controller 105 transfers parity data into $E^2$PROM 8. This process is repeated 512 times, until all data has been transferred from the SRAM 2 to the $E^2$PROM 8. Control circuit 101 includes both a counter which counts 64 word blocks and the above-mentioned state machine.

Upload sequencer 106 triggers control circuit 101 to generate the necessary timing to generate the read and write signals required for the downloading operation.

Upload sequencer 106 is implemented similarly to download sequencer 108, to transfer data in opposite direction from the $E^2$PROM 8 to SRAM 2 wherein both input power and the backup voltage exceed their respective thresholds 33 and 36 (FIG. 5). At the completion of each 64 word block transfer, the generated row/column parities are compared to the stored parities for the determination of the failure locations so that uploaded data can be corrected.

Control circuit 101 receives data error information 102A from Data In parity check circuit 102, and also receives external read and external write signals and control signals on bus 101A. Control circuit 101 also receives control signals generated by host computer 120 on bus 101A. Control block 101 is configured to provide back plane timing signals and protocol and internal SRAM and $E^2$PROM timing. The timing element input is a delay line which is triggered by either an external cycle initiate trigger signal or an internal trigger stimulus. External trigger signals are the result of a request for read/write cycles from the host processor 120. Internal trigger signals result from internal requests for transfers, i.e., transferring data from SRAM 2 to $E^2$PROM 8 or vice versa. After an initial edge on the delay on a delay line following edges are produced by the conventional delay line circuitry at 25 nanosecond intervals, and suitable gain circuitry is provided to generate timing signals used to produce the sequence of handshaking required by the host computer 120, the setup timing, the hold times, and the access, read, and write timing signals required by SRAM 2 and $E^2$PROM 8 for an uploading or a downloading operation. Control circuit 101 also includes a mode sensing circuit which determines if a particular cycle is a read cycle or a write cycle. Once this information is latched, then the time sequence controlling data flow through the data input latch in block 102, the encryptor/decryptor circuit 112, the Hamming code generator 109, the Hamming comparator/corrector circuit 110, and the Data Out parity check circuit 104, and the column parity accumulator 103 can be processed. The control circuit 101 also provides feedback to the upload sequencer 106 and the download sequencer 108 allowing them to "bump" to the next address or sequence during the data transfers.

Column parity accumulator 103 performs exclusive OR functions necessary to accumulate column parity, as subsequently explained with reference to FIG. 4.

Figure 6A:
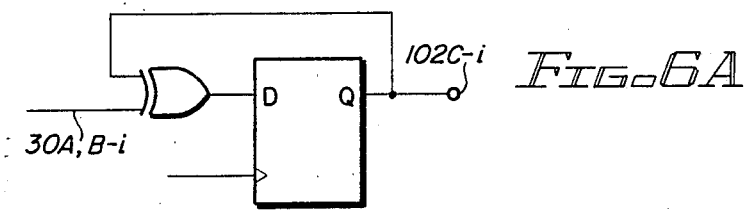
FIGS. 6A and 6B are logic diagrams useful in describing certain blocks in FIG. 3A.

More specifically, column parity accumulator 103 includes a 16 bit exclusive OR register, each bit of which may have the configuration shown in FIG. 6A, where i represents a particular bit of the lower and upper data bytes on data bus 30A,B. For each bit, if a particular logic level already is stored in the D type latch, and if the next value of the same bit loaded into the register is of the opposite logic level, a mismatch will be produced, and a "1" will appear on the output terminal 102C-i.

Row/column parity accumulator control circuit 105 is used to control transfer of parity data from internal registers to scratch pad SRAM 2C, and then from scratch pad SRAM 2C into E²PROM 8. During upload operations row/column parity accumulator control circuit 105 controls the comparison of generated parities to the previously stored parities and then helps effectuate correction of failed locations, as explained subsequently with reference to FIG. 4.

Data In parity check circuit 102 latches data from internal data bus 30A,B, performs a parity check on the 18 bits on data bus 30A,B, generates a data error signal on conductor 102A if an error is detected, and makes the latched data available to column parity accumulator 103 via conductors 102C or to encryptor/decryptor circuit 112 if it is presently enabled. If encryptor/decryptor circuit 112 is presently disabled, Data In parity check circuit 102 makes the latched data available to bus 112A, and hence to Hamming code generator 109 and Hamming comparator/corrector circuit 110. The parity check is a dual byte parity check which involves exclusive ORing of the first data byte D0, D1 . . . D7 with the first (lower byte) parity bit D8 and logically ORing that with the exclusive OR of the second byte of data D9, D10 . . . D16 and the second (upper byte) parity bit which is D17. This expression produces the data error signal on conductor 102, as indicated by the following equation:

$$\text{DATA ERROR} = (D0 \oplus D1 \oplus \cdots \oplus D7 \oplus D8) \oplus (D9 \oplus D10 \oplus \cdots \oplus D16 \oplus D17)$$

Data Out parity generator 104 receives 16 bits of data via bus 103A from column parity accumulator 103 and generates the parity bits D8 and D17 for the lower and upper bytes of data, respectively. It receives corrected data from Hamming comparator/corrector 110 via bus 110C, and also performs the function of driving data bus 30A,B. The following equations show that lower parity bit D8 is the exclusive OR of the lower data bits D0, D1 . . . D7 on corrected data bus 110C, and upper parity bit D17 is the exclusive OR of bits D9 through D16 on corrected data bus 110C:

$$D8 = D0 \oplus D1 \oplus \cdots \oplus D7$$

$$D17 = D9 \oplus D10 \oplus \cdots \oplus D16$$

Encryptor/decryptor circuit 112 receives an enable/disable signal on conductor 101D from controller 101 to perform an encryption/decryption function during downloading and uploading. Encryptor/decryptor circuit 112 is bypassed during accessing of SRAM 2 by host computer 120. Encryptor/decryptor circuit 112 receives a 56 bit "security key" from fully eraseable 56 bit magnetic register 111 serially via conductor 111A. During upload or download operations the encrypted/decrypted output is supplied on bus 112A to Hamming code generator 109 and Hamming comparator/corrector 110. The encrypted data stored in E²PROM 8 can be very quickly made un-decryptable, and hence "effectively erased", by merely erasing the security key word from magnetic register 111. Encryptor/decryptor circuit 112 could be implemented by using a Western Digital WD2001/WD2002 encryption/decryption devices which are designed to encrypt and decrypt 64-bit blocks of data using the algorithms specified in the Federal Information Processing Data Encryption Standard No. 46 using a 56 bit user-specified key to produce a 64-bit cipher text word. Alternately, the publicly known algorithm can be programmed into the ASIC 115, which is the applicant's preferred embodiment. The Western Digital Corporation June, 1984 Communication Products Handbook provides a detailed explanation and an application note.

Hamming code generator 109 receives the 16 bits of latched data present on bus 112A and generates 6 bits of Hamming data on bus 109A. This is an entirely standard function that can be readily implemented by those skilled in the art from any text on Hamming codes. The Hamming code equations are well known and can be implemented using commercially available circuits or by programming ASIC 115 to exclusive OR the latched and encrypted data bits on bus 112A.

Figure 6B:
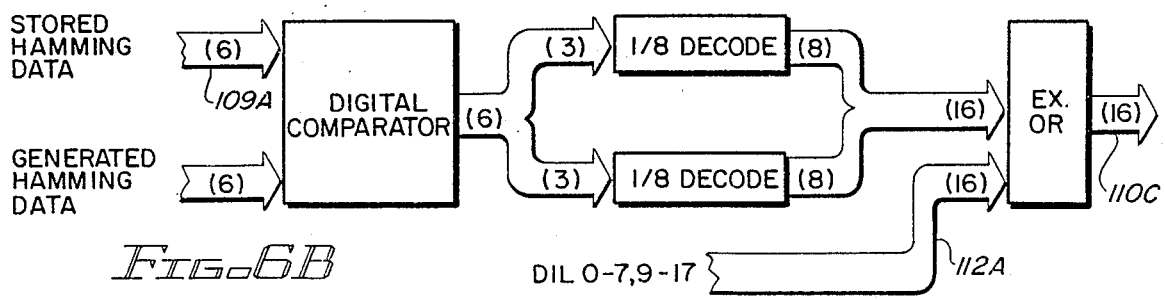

Hamming comparator/corrector circuit 110 receives both the 16 bits of latched data on bus 112A and also receives the 6 bits of Hamming data supplied on bus 109A by Hamming code generator 109 or read out of Hamming data section 2B of SRAM 2. Hamming code generator 109 regenerates the Hamming codes. The Hamming data that is regenerated is compared to the Hamming data that was previously stored. Based on this comparison, a bit pattern is generated that can then be exclusively ORed with incorrect data to produce the corrected data on bus 110C. FIG. 6B indicates the implementation of Hamming comparator/corrector 110.

Maintenance control circuit 150 performs the function of error logging.

Data Out parity check circuit 104 produces two parity bits which are included with the two byte of corrected data to internal data bus 30A,B. The corrected data and its two parity bits can be read via buffer 26C by host computer 120. If the present data has in fact been corrected, it is also rewritten into SRAM 2 by applying a write command to SRAM 2 in order to write the corrected data into the present address (which still is available on address bus 28B).

A normal write operation by host computer 120 includes addressing SRAM 2 via address bus 28A to generate the chip addresses on internal address bus 28B and the necessary SRAM chip select signals on conductors 100A. The data to be written is applied to Data Input conductors 30A, including 16 bits of data and two parity bits. This data is latched into Data In parity check circuit 102 and stripped of the parity bits. The data is input via bus 112A to Hamming code generator 109 to produce the corresponding Hamming codes on Hamming bus 109A. Then the Hamming data on bus 109A is written into SRAM section 2B, and the data on data bus 30A,B is written in SRAM section 2A.

A normal read operation by bus host computer 12 includes addressing SRAM 2 via address bus 28A to generate the chip addresses on internal address bus 28B and the necessary SRAM chip select signals on conductors 100A. The data read from SRAM 2 is latched into Data In parity check circuit 102, bypasses the encryptor/decryptor 112, and is applied to Hamming code generator 109. The generated Hamming codes are compared to the previously stored Hamming codes in block 110, which detects data errors and supplies corrected data on bus 110C. Two parity bits are added to the corrected data by Data Out parity check circuit 104. The corrected data and the Hamming data on six bit Hamming data bus 109A then are simultaneously written into the presently addressed word of sections 2A and 2B, respectively, of SRAM 2 by means of a write command.

The addresses of any errors detected by Hamming comparator/correction circuit 110 are stored in the scratch pad section 2C of SRAM 2 along with a count of how many times an error has occurred at that address of SRAM 2 in response to maintenance control circuit 150.

A downloading operation occurs when both a $\overline{P}_{INK}$ signal and an $\overline{E}_{OK}$ is received by control circuit 101, indicating both loss of input voltage 10 below the input power threshold 33 and loss of the backup voltage 65 below energy threshold 36 (FIG. 5).

However, if only the $\overline{P}_{INOK}$ signal has been received, control circuit 101 puts the non-volatile memory system 1 into the above-mentioned "hold mode" and turns off MOSFET 91A. (MOSFET 91C already will be off.) Then operating power will be absent from $E^{PROM}$ 8, and SRAM 2 will be powered by a 2 volt standby voltage produced on conductor 12 by 3 volt zener diode 92 in FIG. 2, maintaining all of the data in SRAM 2 with a very low current drain. If the input voltage on conductor 10 returns before the $\overline{E}_{OK}$ signal is received, the $\overline{P}_{INOK}$ signal disappears. SRAM 2 and all of control circuitry 22 are supplied by the normal 5 volt levels, and normal read and write operations by host computer 120 are continued.

If the $\overline{E}_{OK}$ signal is received while $\overline{P}_{INOK}$ is present, control circuit 101 triggers download sequencer 108 via one of conductors 108A to download the data of SRAM 2 into E$^2$PROM 8. Download sequencer 108 triggers address generation circuit 107 by means of one of conductors 108B, causing address generation circuit 107 to generate addresses A15–A17 of SRAM 2, causing address decode circuit 100 to generate the corresponding chip select signals on ten conductors 100A to select one of the SRAM chips 2A-1, 2A-2, etc. at a time. Download sequencer 108 also causes address decode circuit 100 to generate chip select signals 100B to select corresponding E$^2$PROM chips 8A-1, 8A-2, etc. one at a time, and also causes data at each address to be read from SRAM 2, input to data in parity check circuit 102 and applied via 16 conductors 102C to column parity accumulator 103. Address generator 107 also generates addresses A0–A14 in response to download sequencer.

At the same time, the data on internal data bus 30A,B is written into the same location of E$^2$PROM 8 and also is written into the scratch pad section 2C of SRAM 2 to accumulate row parity data under the control of row/column parity control circuit 105, as subsequently described with reference to FIG. 4. The accumulated row parity and column parity then are written into corresponding locations of scratch pad memory 2C and row parity section 8B of E$^2$PROM 8 after scanning of a "row" is complete. At the end of the download cycle, all of the data and all of the associated row and column parity bits from SRAM 2 have been loaded into corresponding locations of E$^2$PROM 8.

An uploading operation is initiated when the $\overline{P}_{INOK}$ and $\overline{E}_{OK}$ signals disappear, indicating the return of input voltage on conductor 10 to a value above input voltage threshold 33 and indicating that backup voltage 65 has increased above threshold 36. When that happens, control circuit 101 generates a signal on one of conductors 106A causing upload sequencer 106 to produce signals on conductors 106B that trigger address generator 107. Address generator 107 produces addresses A15–A17 signals on conductors 107A which are decoded by address decode circuit 100 to generate SRAM chip select signals 100A and corresponding E$^2$PROM chip select signals 100B to access corresponding locations of E$^2$PROM 8 and SRAM 2 as necessary to upload data from E$^2$PROM 8 back to SRAM 2. Address generator circuit 107 also generates the addresses A0–A14 on conductors 28B in response to upload sequencer 106.

Data read from the accessed location of E$_2$PROM 8 appears on internal data bus 30A,B. The row parity and column parity are accumulated. The row and column parity are checked against the corresponding row and column parity for the previous downloading stored in E$_2$PROM section 8B. If a mismatch is found, an error exists in the data transferred to SRAM 2 at the mismatch address. An error pattern identifying the mismatch is exclusively ORed in column parity accumulator 103 with the erroneous data in the SRAM, and the corrected data is rewritten into SRAM 2. More specifically, the corrected data is uploaded into the present address of the selected one of SRAM sections 2A-1, 2A-2, ... 2A-8 by applying a write command to it. The corrected data on data bus 30A,B also is used by Hamming generator 109 to generate correct Hamming codes which are stored at the same address of SRAM section 2B. The above process is repeated until all of the data in E$_2$PROM 8 has been read out, parity checked, corrected if necessary, corresponding Hamming codes have been generated, the corrected data has been stored in a corresponding one of SRAM sections 2A-1, 2A-2, ... 2A-8, and the Hamming data has been stored in a corresponding section 2B of SRAM 2.

If a data error is detected by data in parity check circuit 102 at the present address, data in parity check circuit 102 produces a data error signal on conductor 102A. This data error signal may be read by host computer 120 to inform it that the present data contains an error.

Next, the row parity accumulation technique and column parity accumulation technique and corresponding error correction technique of the present invention will be described with reference to FIG. 4.

In FIG. 4, numerals 8A-1, 8A-2 ... 8A-8 show three-dimensional representations of sections of E$^2$PROM 8 as described above. Each section such as 8A-1 is subdivided into 512 64 word by 16 bit subsections. For example, section 8A-1 includes 512 subsections such as subsection 129, which includes 64 words such as 125 and 128 each having 16 bits. Similarly, section 8A-2 of E$^2$PROM 8 includes 512 subsections 131 each having 64 16 bit words, such as word 130. Similarly, section 8A-8 includes 512 64 word subsections 136.

Although not shown in FIG. 4, sections 2A-1, 2A-2 ... 2A-8 of SRAM 2 also each are similarly subdivided into 512 64 word by 16 bit subsections. Row parity accumulation and column parity accumulation are accomplished for SRAM 2 by scanning SRAM 2 in precisely the same fashion as for E$^2$PROM 8.

In FIG. 4 scratch pad RAM 2C includes a single 64 word by 16 bit "row parity accumulator" subsection 132, which includes 64 16 bit words such as 133, 134, etc. Individual corresponding bits of all of the above 64 word by 16 bit subsections of E$^2$PROM sections 8A-1 ... 8A-8, SRAM subsections 2A-1 ... 2A-8, and 64 word by 16 bit subsection 132 of scratch pad 2C of SRAM 2 are addressed by the same group of address conductors of address bus 28B.

"Column parity accumulator" register 103 of ASIC 115 of FIG. 3C is shown in FIG. 4 for convenience.

The group of 64 word by 16 bit subsections 129, 131 ... 136 of E$^2$PROM 8 (or a similar row of subsections of SRAM 2) is referred to herein as a "row" for the purpose of describing scanning of E$^2$PROM 8 or SRAM 2 to accumulate row and column parities during an upload operation or a download operation of non-volatile memory system 1. In FIG. 4, exclusive OR gates 126, 127, and 137 are shown to assist in describing the functions of exclusive ORing corresponding bits on a "bit per chip" basis during "row" scanning to accumulate row and column parity, in accordance with the present invention.

First, the row and column parity accumulation will be described for an uploading of data stored in E²PROM 8 into SRAM 2. The first step in the scanning procedure is to sequentially read the contents of the first word 125 in subsection 129. That entire word 125 is stored in the first word 133 of SRAM scratch pad subsection 132. Word 125 also is written into column parity accumulator 103. Next, the second word 128 of subsection 129 is written into a second word 134 of scratch pad subsection 132, and is exclusively ORed with the contents of column parity accumulator 103 as indicated by Exclusive OR gate 137. The results replace the previous contents of column parity accumulator 103. The next step is to repeat the above process for the third 16 bit word and all subsequent 16 bit words of subsection 129. At this point, all of the data in subsection 129 has been transferred to scratch pad section 132, and the column parity for section 129 has been accumulated in column parity accumulator 103.

Then the above process is repeated for section 8A-2, except that each bit in each word of subsection 131 is exclusively ORed with the corresponding bit in scratch pad subsection 132 and the results are loaded into scratch pad subsection 132. The accumulated column parity then is written into the first word 142 of another 64 word by 16 bit subsection 141 of scratch pad RAM 2C. Meanwhile, column parity is accumulated for section 131 in column parity accumulator 103. Exclusive OR gate 126 illustrates the exclusive ORing of corresponding bits in first word 125 (after it is transferred to scratch pad subsection 132) with the corresponding bits in word 130 of subsection 131 and storing the results in word 133 of scratch pad subsection 132. Exclusive OR gate 127 represents the last such exclusive ORing in the first "row". When the entire "row" consisting of subsections 129, 131 . . . 136 has been scanned, the row parity for the entire "row" has been accumulated in scratch pad subsection 132, and the column parities for each of those subsections has been accumulated in the first eight words of scratch pad subsection 141.

Then the contents of subsection 132 of row parity accumulator subsection 132 and the contents of column parity accumulator subsection 141 are compared with corresponding row parity and column parity stored during the previous downloading operation into sections 8B and 8C, respectively, of E²PROM 8. Simultaneously, all of the data being scanned and read out of E²PROM 8 is being written into corresponding locations of SRAM 2. Whenever a mismatch is found between the present row and column parity and the row and column parity stored in sections 8B and 8C of E²PROM 8 during the previous downloading operation, that row and column parity is exclusively ORed with the data just read out of the corresponding location of E²PROM section 8A to correct the data. The result of that exclusive ORing represents a two-dimensional map of any erroneous bit positions. The third dimension information needed to locate the error precisely is derived from the exclusive ORing of the column parity information in subsection 141 with previously stored column parity information from the previous down-loading operation. The result of that exclusive ORing represents the erroneous bit positions in the columns of the "row" 129, 131 . . . 136 being scanned. It is necessary to match bit positions in the "row error pattern" and "column error pattern" in order to properly locate the erroneous bit. This is performed by testing these row and column error patterns for each of the sections 8A-1, 8A-2 . . . until a match is found.

Once the location of the error is found so as to produce a row-column bit position match, that match is exclusively ORed with the data in the SRAM at the identified location to correct the erroneous data. The row-column bit match is obtained by logically ANDing the row error pattern and the column error pattern to produce the "correction data" which then is exclusively ORed with the erroneous data from the SRAM at the identified address.

The above "row" scanning procedure during uploading allows corrected data for an entire section such as 8A-1, 8A-2 etc. to be conveniently corrected if necessary and uploaded into SRAM 2, because all of the wrong row and column parity data corresponding to that chip can be stored in sections 8B and 8C and used to correct the erroneous bits. The above scanning procedure is particularly advantageous in view of the probable failure modes of SRAM chips, since if there is a failure in one bit of an SRAM chip, the probability of another failure in another bit of the same chip is high.

For downloading, the scanning procedure is identical except that in FIG. 4, E²PROM sections 8A-1, 8A-2 . . . 8A-8 are replaced by SRAM sections 2A-1, 2A-2 . . . 2A-8. The same scratch pad subsections 132 and 141 and the same column parity accumulator 103 are used for both uploading and downloading. However, the accumulated row parity data in scratch pad subsection 132 and the accumulated column parity data accumulated in scratch pad section 141 are not used to locate and correct errors during downloading, but are simply stored in E²PROM sections 8B and 8C at the end of scanning of each "row". The row and column parity data is then available for error correction during the next uploading operation, as described above.

Appendix 1 attached hereto shows how ASIC 115 can be programmed to produce the configuration of FIG. 3B.

The above-described non-volatile memory system provides a plug-in replacement for a core memory system providing the advantages of non-volatility, and is capable of providing substantially faster access times and cycle times than a comparable core memory. Reliability is greatly increased over that of a core memory system because of the use of integrated circuit components and attendant reduction in the number of solder connections. The amount of power dissipated is much less than that of a comparable core memory, resulting in much less generation of heat and thermal stressing of components and component connections. This contributes greatly to long term reliability. The described error detection and correction techniques further increase the reliability of the described memory system over a core memory system replaced thereby. Problems associated with the wear-out phenomena of with E²PROMs are avoided. The hold mode duration is automatically "self-adjusting" to meet variations in energy stored in the backup capacitor and current drain by circuitry that discharges the backup capacitor during a power interruption due to aging, temperature changes, etc. The secure key using a ferrite core register as a completely erasable security key for encryption and decryption of data provides the advantage of a secure system which can allow confidential data to be more conveniently "declassified".

While the invention has been described with reference to a particular embodiment thereof, those skilled in the art will be able to make the various modifications to the described embodiment of the invention without departing from the true spirit and scope of the invention. For example, certain very high capacitance double layer low voltage capacitors could be used which are not charged to a boosted-up voltage. Alternatively, certain kinds of batteries might be used instead of a backup capacitor.

What is claimed is:

APPENDIX "1"

```
:10000000FF04F035F3ECFFFFFFFFFFFFF9FDFBBF3F
:10001000FFFFFFFFBFFFFFFFDFFFEFF7F7F7F7F788
:10002000F73732F5F7EFEFEFEDEFEFEFEFEFEFFF31
:10003000F6FEFEFEFEFEFEFEFEFEFEFDFDFDFDFDED
:10004000FDFDFDFDFDCFFFFFFFFFFFFB77FDDFFFFE4
:100050007FFFFFFFFEFFFFFFFFFFFFFF8FFFFFFFF38
:10006000FFF7BFBFFFFFFFFFFFFFFFFFFFFFFFEF38
:10007000EFDFFFFFFFFFFFFFFFFFFFFFFFFFFFFFC0
:10008000FFFFFFFFFFFFEFEFEFEFCFEFEF6FEFF93
:10009000FEFDFDFDFDFDF9FDFDFDFDCFEFEFEFEFF9
:1000A000EFEFE7EFEFEFDFDFDFDFDFDFDFDFDFDF08
:1000B000FFFEFDFDFDFBFDFF5EFEFCFBFFFBFBFBF12
:1000C000FBF7FBFBFBFBCFFFFFFFFFFFFFFFFBB9D6
:1000D000FFFFFFFFFFFFFFFFFFFFFFFF3E3F3F3F31
:1000E0003F3F3F3FBF3F7F7E7E7E7E7E7E7E7E7631
:1000F000FEEFFFFFFFFFEFFFFFFEEF7F7FEFFFFDF7FF3
:10010000FFFFFFFFFFFFFEF7E7F7F7FFFFEFBDF7FB4
:10011000FFDDFFEFEFEFEFEFFFEFEF6EFFFFFFFF11
:100120007FFFFFFFFFFFFFFFFFFFFFFFFFEFFFFF6F
:10013000FFFFFEFFFFFFFFFFFFFFFFEFBFBFFFFF60
:10014000FFFFFFFFFFFF7FEEFFFFFFFFFFFFFFFF50
:10015000FFFFFFFFFFFFFFFFFFFFFFFFFEFDEFFFE0
:10016000FFFFFFFF37FDFFFFFFFFFFFFFFFFFFFF69
:10017000FFEFEFFFFFFFFFFFFFFFE3FFFDFFFFFFCD
:10018000FFFFFFFFFFFFFFFFFEFFFFFFFFFFFFFF80
:10019000FDFFFFFFFFFFFFFFFFFFBFFFEFFFFFC1
:1001A000FFFFFF7FFF9FFEFFFFFFFFFFFBFFFFFF44
:1001B000FFFFFFCFFFFFFFFFFFFFFFFEFFFFFFFF53
:1001C000FFFFFFFFFFFFFFFFAEFFFFFFFFFFFFFF90
:1001D000FFFFFFFFFFFFFFFFFFFFFFFFFFFAFF34
:1001E000FFFFFFFFBFFEFFFFFFFFFFFFFFFFFFFF60
:1001F000FFFF7BEFFFFFFFFFFDFFFFF7BFFFFFFFF47
:10020000FFFFFEFFFFFFFFFFFF79EFDFFFFFFFFF6A
:10021000BFFFFFFFFF7FFB7FFB7FFB7FFBDFAEFFAF
:10022000FFFFFFFEFFFFFFFFFFFFFFFFFFFFFFFFDF
:10023000FFFFFFFFAFFFFFFDFFFFFFFFFFFFFEF03
:10024000FFF6FFF6FFF6FFF67F6FFFFFFFFFFFFF2
:10025000FFFFFFFFFDFD7FFD7BED7FBD3FEE73E73
:10026000FFFFFFFFFFFF3FFFFFFFEF7FBE7FFE7F30
:10027000FE7FFEFFCFF2FFFFFFFFFFFF3FFFFFF59
:10028000FFE7FFE7FFE7FFE7FFE83EFDFFFFFFFF85
:10029000FF3FFFFFFFFFFFFF7FFF7FFF7FFF7FFAF9E
:1002A000F3FFFF7FFFFFFFE3FF7FFDFFFFFFFFF88
:1002B000FFFFFFFFFF3EFFFFFFFFFFFF3FFEFFFFD0
:1002C000FFFFFFFFFFBFFFFFFFFFFFEFD3FFFFFFEBB
:1002D000FFFFF3FFFFFFFFFFFFFFFFFFFFFFBFF3E
:1002E0003EFFFFFFFFFFFF3FFFFFFFFF7FFE7FFEA1
:1002F0007FFE7FFEF7EFF3FFFFFFFFFFFFFF3FFFF40
:10030000FBFFA7FFE7BFE7FFE7FFFBFEFFFFFFBF26
:10031000FFFFFFFFDFBFFFFFFFFFFFFFFFFFEF7FDF
:10032000EEFFFFFEFFFBFFFF7FFFFFFFFEFFFFFF74
:10033000FFFFFFFFFBEFDEFFFFFFBFFDFFFFFFFF44
:10034000FFFFFFFFFFFFFFFFFFFF7FFEFFFFFFFFFFD5
:10035000FBFFFFFFFFFFFFFFFFFFFFFFFFFFFFFFB1
:10036000FDFEFFFFF3FFEFFFFFFEFFFFFFFFFFFF71
:10037000FFFFFFFFFFFBFEFFFFFFFFFFC3FFFFFFFF19
:10038000FFFFFFFFFFFFFFFFFFFFFFF9FFFCF7FFEF9E
:10039000003FFFFFFFFEFFFFFFFFFFBFDFFFFFFFFF9E
:1003A000FFAEFFFFFFFFFF3FFFFFFFFFFFFFFFFFBA
:1003B000FFFFFFFFFFDFFFFAFFFFFFFBFEFFFFFF59
:1003C000FFFFFFFFFFFFFFFF7FFFFF77FEFFEFFFDE
:1003D000FFF9FFFFFF7FFFFFFFFFFFFFFFFFFFFFB3
:1003E000FFF7DEFFFFFFBFFDFFBFFDFFFFFFFFFFCA
:1003F0007F7BFB7FFB7FFBAEFFFFFFFFFFFFFFFF6E
:10040000FFFDFFFFFFFFFFFFFFFFFFFFFFDFAFFFF05
:10041000FFFFFFFFBFFFFFFFFFFFFFFFFF6D6FFF667
:10042000DF76EFFFFFFFFFFFFFFFEBFFFFFFFFBFE9
:10043000FFD7D7FFD7FED7E3FEFFFFFFFFFFFFFF8A
:10044000FFFFFFFFFFFFFF7F7EFE7FFE7FEECFFFFF00
:10045000FFFFFFFFFFFFFFFFFFEFFFFFFFE7E7FFE7FF5
:10046000FFE7EFFEFFFFFFFFFFFFFFFFDFFFFFFFC7
:10047000FFFFF7F7FFF7FFF7AFFFFFFFFFFFFFFFFC
:10048000FFFFFFFFFFFFFFFFFFFFFFFFEFFFBFEFF82
:10049000FFFFFFFFFF3FFFFFFFFFFFFFFFFFFFFF2C
:1004A000BFFFFFEFFFFFFFFFFFFFFFFD3FFFFFFFD8
:1004B000FFFFFFFFFFBFFFBF7FEFFFFFFFFFEFF5E
:1004C0003FFFFFFFFFFFFF7F7EFE7FF67F7EEFFF98
:1004D000FFFFFFFFFFFFFF3FFFFFBFFFFFFE7E7FF6C
:1004E000E3FFE7EFFEFFFFFFFFFFFFFFDFFFBFBF01
:1004F000FFFFF7FBFFFFFBF7EEFFFFFFFFFFFFFF25
:10050000FFFFFFFFFFFFFFFFFFFFFFFFFEEFEFDE3D
:10051000FFFFFFFFFFFFFFFFFFFFFFFFFFFFFF7F3
:10052000FFFF7FFBEFFFFFFFFFFFFFFFFFFFEFF70
:10053000FFFFFFFFFFFFBF7FF7FDFEFFFFFFFFFF96
:10054000FFFFFFFFFFFFFFFFFFFFFBFBF7FEFEFDB
:10055000FFFFFFFFFFFFFFFFFFFFFFFFFFFDFFAD
:10056000FFFBFFB7FFF4FFFFFFFFFFFFFFFFFFF2
:10057000FFFFFFFFFBFFFFAFFCAEFEFFFFFFFF70
:10058000FFFFFFFFFFFFFFFFFFFFFFFFFDFDEFFF8F
:10059000FAFFFFFFFFFFFFFDFFFFFFFFFFFFFF90
:1005A000FFFFFF7F7EEFFEFDFFFFFFFFFBFFFFAF
:1005B000FFFFFFFFFFFFBFFBFBF7F7FEFFFFFFFA4
:1005C000FFFFFFFFFFFFFF7FFB7FFB7FFB7F7BFBCF
:1005D000AEFFFFFFFFFDFF7FFFFFFDFFFFFFFFFF00
:1005E000FFFFBFFFFFDFAFFFFFFFFFFFFFFFFFFF26
:1005F000DFFFFFF6FFF6FFF6FFF567FEFFFFFFFFFF7F
:10060000FFFFFFFFFFFFFFFFFD7FFD7FFD3FBD7DFC2
```

```
:10061000E7FEFFFFFFFFFFFFFFFFFFFFFF7FFE7F04
:10062000FE7FFE7F7EFECFFFFFFFFFFFFFFFFFFF8E
:10063000FFFFFFE7FFE7FFE7FFE7DBEFFEFFFFFF5F
:10064000FFFFFFFFFFFFFFFFFFFF7FFF7FFF7FF775A
:10065000FAAFFFFFFFFFFFFFFFFFFDFFFFFFFF01
:10066000FFFFFFFFFF9EFFFEFFFFFFFFFFFFFFFFFC
:10067000FFFFFFFFFFBFBBFFFFDF7FFEEFFFFFFFBF
:10068000FFFFFFFFFFFFFFFFFFFFFFFFFFFFDFB80
:100690009FFFFEFFFFFFFFFFFFFFFFFFFFFF7FBE8C
:1006A0007FFE7FFE7F56FEEFFFFFFFFFFFFFFFFF96
:1006B000FFFFFBFFE7FF67FFE7FFE7FFFFFEFFFF2F
:1006C000FFFFFFFFFFFFFFBFFFFFFFF5FFC7FFFBFDD
:1006D000FC7FEFFFFFFFFFFFFFFF7FFFFFFFFFEFF3E
:1006E000FFA7FFF7FEAFFEF7FEFFFFFFFFFFFFFFD5
:1006F000FFFFFFFFFFFFFF7FFB7FFB6FDB7FEFFFFF56
:10070000FFFFFFFFFFFFFFFFFFFFFFF7FA7FFB37F9D
:10071000F7BFFEFEFFFFFFFFFFFFFFFFFFFFFFFF33
:10072000FF7FFEFFFC7FEDFFEFFFFEFFFFFFFFFF00
:10073000FFFFFFFFFFFFFFA7FFAFFB977FFDFCFF62
:10074000FFFFFFFFFFFFFFFFFFFFFFF5FFCFFEA71
:10075000AFFEFFAEFFFFFFFFFFFFFFFFFFFFFF4B
:10076000FDFFE7FFEFFFEFFDFFFAFFFFFFFFFFFFDA
:10077000FFFFFFFFFFFFBF7FF5DBFDFFFE7FAFFF4A
:10078000FFFFFFFFFFFFFFFFFFFFFFFFF7BBEFD5
:10079000FBF7FFF7FEFFFFFFFFFFFFEFFFFFFEFFF9E
:1007A000FF7F7B7B7B7B7BFBAEFFFFFFFFFFFF46
:1007B000FFFFFFFFFFFFFFFFFFDFFFFBFFFFFFA90
:1007C000FFFFFFFFFFFFFFFFFFFFFFFFFF6BE760C
:1007D000FF76FF56AFFFFFFFFFFFFFFFFFFFFFAB
:1007E000FFFD79FD7D7D3D7D7E6FEFFFFFFFFFF87
:1007F000FFFFFFFFFFFFFF7FFE7E787E6EBECF96
:10080000FFFFFFFFFFFFFFFFFFDFFFFFFE7EFE73A
:10081000FBE7FFE7EFFEFFFFFFFFFFFFFFFFFFF2D
:10082000FFFFFFD7FA779A77FAF7AFFFFFFFFFFDD9
:10083000FFFFFFFFFFFFFFFFFFCFFF9DFB9DFFFFC0
:10084000FEFFFFFFFFFFFFFFFFFFFFFFFFF7FBF79
:100850003FFE3FBEDFEFFFFFFFFFFFFFFFFFFFE9B
:10086000FFFFFFD97FF9FFF9FFFFFEFFFFFFFFC3
:10087000FFFFFFFFFFFFFFFF7F7E797E7C3E7CFE58
:10088000EFFFFFFFFFFFFFFFFFFFFFBFFFF67D54E
:1008900067FFE7FFE7EFFEFFFFFFFFFFFFFDFFF61
:1008A000BFBFFF7FFEEFFFB7EEFFD9EFFFFFFFFF8
:1008B000FFFFBFBFFFBF7FFFFFFFFFCDFECFFFE505
:1008C000FFEFFFFFFFFFFFFFFFFFFFFFFFFFF345
:1008D000FFFA6FFBFFFBEFFFFFFFFFFFFFFFFFFD5
:1008E000FFFF7FFFE7FFFBFFF77BE7FFFEEFFFFF69
:1008F000FFFFFFFFFFFFFFFF7FECF7FF77FDFF2D
:10090000EFEFFFFFFFFFFFFFFFFFFEFFFFBF58
:10091000FFAFF9B7FEA6FFFCFFFFFFFFFFFFFFE2
:10092000FFFFFFFFFBFFBFFDE9FFAFFFFAEFFFFFFF2
:10093000FFFFFFFFFFFFFFFFE7FFFFFFEBFFF3
:10094000E7FFFAFFFFFFFFFFFFFFFFFFFFFF5F74
:10095000FE7FFD7FFE777DAFFFFFFFFFFFFFFF05
:10096000FFFFFFFFBFEFFFEFFFF7FFF3F7FEFFFF14
:10097000FFFFFFFFFFFFFFFFFF7F7B7B7B7B5B3F
:100980007BFBAEFFFFFFFFFFFFFFFDFFFFFFFFFF52
:10099000FFFFFFFFFFBFDFDFEFAFFFFFFFFFFFFFFF75
:1009A000FFFFFFFFFFFF76FF76FF36DF767FAFFFFFAB
:1009B000FFFFFFFFFFFFFFFFFFFFFFFD7DBD7DFD7DF23
:1009C00097DDE7FEFFFFFFFFFFFFFFFFFFFFFF7F5A
:1009D0006E7FEFE697E7E7EBECFFFFFFFFFFFFFFC4
:1009E000FFFFFEFFFFE7E7FFE7DFE7DFEFFEFFE1
:1009F000FFFFFFFFFFFFFEFDFFFFFFF779AF7FA77B9
:100A0000FA77FAAFFFFFFFFFFFFFFFFBFFFFFFF18
:100A1000FFE7FFD7FFDFFFFFFFFEFFFFFFFFFFFF47
:100A2000FFFFFFFFFFFF7FFE7FFF3FFE7FFEEFFF29
:100A3000FFFFFFFEFFFFFFBFFFFFFFFFF9579AFFF47
:100A40009FFFBFF7FEFFFFFFFFFFFFFFFFFFFFFF5F
:100A50007F5E7EFE7B7E383EFEEFFFFFFFFFFFFFE7
:100A6000FFFFFFFFFBFF63E7A7FF65FF67FFE6FEF2
:100A7000FFFFFFFFFFFFFFFFBFEFFFFFFFFF75F7E
:100A8000D6FFB8FFEFFFFFFFFFFFFFFFFFFF7FFF76
:100A9000FFDFFFFFFFBFFFFCFFFFFFEFFFFFFFFFBB
:100AA000FFFFFFFFFFFFFAFAFFEAFFFB7FF37FEF95
:100AB000FFFFFFFFFFFFFFFFFFDFFFF77F7FFEF7F68
:100AC000E77EF7FFFFFEFFFFFFFFFFFFFFFFFFD8
:100AD0007F6FFFF7FE7FFC3FFFFFEFFFFFFFFFBFD2
:100AE000FFFFFFBFFFFFAFAFFFAF7FBFFFB7FBFF52
:100AF000FCFFFFFFFFFFFFFFFFFFDFDFFFEFEFFF69
:100B0000FFFBBFECEFAEFFFFFFFFFFFFFFFFFFFAD
:100B1000FFFBFDFFFFF9E7FDEFFFFFFAFFFBFFFF24
:100B2000FFFFFFFFFFFF7FBDB97FFD3FFEFFFE7FA1
:100B3000AFFFFFFFFFFFFFFFFFFFFFF7FF7F7FFF7AD
:100B4000FBEFFFF7BFF7FEDFFFFFFFFFFFFFFFFF3A
:100B5000FF7F7B5B7B7B5B3B7BFBAEFFFFFFFFFF1A
:100B6000FFFFFFFFFFFFEFFFFFFFDFFFFFFFFFFF98
:100B7000FDFAFFEFFFFFFFFFDFFFDFFFFFFFFEF6E6
:100B8000FE36FF56BF56AFFFFFFFD7FFFFFFF7F23
:100B9000FFFFFD7D3D7D7DED397D7E7FEFFFFFFFF
:100BA000EFFFFFFFFFFFEFEFDD39FE79FE7D3E7EB9
:100BB000BECFFFFFFFFFFFFFFFFFFFFFFBEFE7E2
:100BC000EFE7DDE7FFE7EFFEFFFFFFFFFFFFFFC0
:100BD000FFFFFFFDFAD7FA77F877FAF7AFFFFFFFCD
:100BE000BF7FFFFFFF7DFFFFDF5FFFDFFF87FBDFD3
:100BF000FFFFFEFFFFFFFFFFDFFFFFFFDFFFFB9FF50
:100C0000FFFFF7FF7FBEFFEFFFFFFFFFEFFFFFFCE
:100C1000FFFFFFFFAFFDADFF9FFF99FBF7FEFFFF5B
:100C2000FFFFFFFFFFFFFFFFFFFF7AFE7A7E7E62
:100C3000707EEFFFFFFFFFFFFFFFFFFFFFB7FFFG8
:100C4000E7FFE7E367DFA7EFFEFFFFFFBFFFFFFF61
:100C5000FFFFBF7FFE7FE83FDF5FFF7F2EEFFFFDD
:100C6000FFFFBFFFFFFEFBFFE7FFC7FF77FDD7EA
:100C7000FF7FF7FEFFFFFFBFDFFFF7FF5FF67FA76
:100C80005FBAFFDA7FFBDFFBEFFFFFFFFFBFFFF3A
:100C9000FFFFFFFF677FE7FFEDFFF7FFE7FFFEFFC7
:100CA000FFFFFFFFFFDFFFFFFF7FFC5FFC6FFD9F8C
:100CB000FE4FFCEFFDFFFFFDFFFFFFD77F7F8FC2
:100CC0007FA77B97FFAF7FBFFEFCFFFFFF3FFFFFCC
:100CD000FFF7FFFFFFFE7FFA7FFFFFEEFFEBAEFFA8
:100CE000FFFFFFF3FFFFFFFFFFE7FFE7FFF7FF58
:100CF000EFFFE5FFFAFFFFFFBFEEDFFFBFFEFD7F67
:100D0000FD7FFDBFFDFFFD7F7A2FFDFFFFFFBBFD6
:100D1000FFFFFBFFFFF7BF7BFF7FFEEFDEFF7FE6F
:100D2000FFFFFFBFFDFFFFBFFDFF7F7BFB7B7B5B0B
```

```
:100D3000787B7BBBAEFFFFFFFFFFFFFFFFDFFDEFF07
:100D40000FBFFBFFFFEFFFFBDFFFEFAFFFFFF7FFFC0
:100D5000FFFFFFFBDF7FFF76DFE6FE76BF767FAF2C
:100D6000FFFFFFFFEFFFFFFBFFFFD6D7D797D7EC
:100D70000D7D7D0FE7FEFFFFF7FFCFFFF3FFFFF77
:100D80007F7E5E7EFE797E7E6EBCCFFFFFFFFFFB27
:100D9000FFFFFFE3FFFFE7E3C7E7FFE3DFE7FFEF67
:100DA000FEFFFFFFBFFDFFFF3FFFFF7FFA77FED78C
:100DB000FB77FA77F88FFFFFFFFFC7FF7FBFE3FFE7
:100DC000FFE3FFC3FB9FFD9EFFFFFFFFEFFFFFFF9FB3
:100DD000FFFFFD3FFEFF7FBE7FFE7FFF7BFE7FFEAE
:100DE000EFFFFFFFFFDBFFFFFFE2FFFFAFFFD7FFDC
:100DF000AFFFBFFD9FF5FEFFFFFFBFEEEFFF3FFF21
:100E0000FFFF7E7E78FE7C7E7C7EFEEFFFFFFFDFB5
:100E1000FBFFBFFFF3FFFB67E7E7E7D3E7FFE79BD6
:100E2000F7FEFFFFFFFFFBFFFFFFF8F7FEFFEFF1C
:100E3000FF7FFCFFE9BFEEFFFFFFFFFFFF7FFFFB4
:100E4000BFFFFE7CF7FFB7F2FFFFFFFFFEFFFFFF0F
:100E5000FFFFFFFDFFDBFF7F7AEB7FFA7FFBEFFFFA
:100E6000F7EFFFFFFFFFFFFFFFFFFFEF7F37F3F
:100E7000A7FBBFFFFFFFDFEFFFFFFFFFFFDFFF41
:100E8000DFFF7F3CFFFFFD7FFE9FDDFFEFFFFFFEA
:100E9000FFFFFDFFFBFFFFEA7B7FFBFFFAFFCFDF8
:100EA000FFFFFCFFFFFFFFF7FFFEFFFFF7FF8EE7D
:100EB000FFF95FFDFFF9FFAEFFFFFFFFFFFFBFF45
:100EC000FFFF7FE5EFFFFDFFFFFFFFFFFAFFFFE3
:100ED000FFEFFFBFFEDFEFEF3FFDD97FBD7FBDFF1F
:100EE000BF5FAFFFFFFFFFFFFFEFFFFFBFFFF7F7A2
:100EF000FFF3BFF5BFFFFFF6FEFFFFFFFFFFBFFDE4
:100F0000FFFF7F735B7B7B5B7B7B7B7BFBAEFFFFB2
:100F1000FFDFFFFFFFFFEFFFFDFFFFFFFFFFFBFF26
:100F2000FFFDFEDAFFFFFFFFEFBFFBFFFFFF7FFFCD
:100F3000BEFGFEB6FF56FF76AFFFFFFFFFFFFFAB2B
:100F4000FFFDFFFFD7D793D7D3FFD7D7D7E7FEFF54
:100F5000FFFFFFFF3FFCFFFFDF7FDE7DFE7FFE5FC9
:100F60005E7EFECFFFFFFFFFFFFFFFF3FFFFFFFFE50A
:100F7000EFE5DFE7FFE7DFE7EFFAFFFFFFFFFFFF48
:100F8000FFFFFFFF7FFAF8F7FBF7FF77DB37AFFFD5
:100F9000FFFFFFFFFFFF7FFFFFFE2DBFFF9FBDF4C
:100FA000FF8FFFFFFEFFFFFFFFFFFFFFFFDFF7B48
:100FB000BAFF3FFFFFBF7FFFFFEFFFFFFFFFFF16
:100FC000FDFFFFFFFFAFAFFFAFFFDBFFAFFDF5FEA4
:100FD000FFFFFFFFFF3FFFFFFBFFFFFE7AFE7EFEEE
:100FE0007B3E7EFEEEFFFFFFFFFFFF37FFFFFEFA7B
:100FF00067DF67F7E7FFE7FF65EFFEFFFFFFFFF34
:10100000FFFF7FFF3F78FE7FFEFFFE7FDEBFB9EF71
:10101000FFFFFFFFFFFFFFFFFFBFFE7E6FFD4FECF71
:10102000FC5FFFFE7FFFEFFFFFFFFFFFFFD7F0E
:101030007AF27FFBFFFABFFBFFFBEFFFFFFFFFFF33
:10104000FFFFFFFFFFE777FFA7FFEFFFE77FE7FD6A
:10105000FEFFFFFFFFFFFFFF3FFEFF7CBF77FEE7C6
:10106000FD6F9CDFEDAFFFFFFFFFFFFFFFFD3FF33
:101070008D27FDA7FFBFFDBFFF87FFFCFFFFFFF21
:10108000FFFFFFBFFE7F7CBE7FFCFFE9FFFBEFFFA2
:10109000AEFFFFFFFFFFFFFE7BFE7E7FFE7FD53
:1010A000FFFFE7FFE7FFFAFFFFFFFFFFFFFFBFFEC6
:1010B0007F7DFD7FFD3FFDFFBEBB7DAFFFFFFFFFDF
:1010C000FFFFFFFFFFB6FF7F5FFEFFCEFBBEBFFF759
:1010D000F7FEFFFFFFFFFFFFFFBFBDF97B7B7BBC1
:1010E000B7B7B3B7BFBAEFFFFFFFFFFFFFFFFF79
:1010F000FFFFFFBDFBFFFFFFDFFFFFEFAFFFFFF4E
:10110000FFFFFFFF7FAF7F3FFF36FF76FF76FF7663
:101110006FCFFFFFFFDFFFFFFFEFEBD7D7D5E379
:1011200006E7D7D7D597E7FEFFFFFFFFFFFFF3FCB
:101130007CF47E7FFE5E7E7E7E7EDCCFFFFFFC9
:10114000FFFFFFFFFFFE3FBF7C7E3EFE7F7E3DFE7AF
:10115000FBEFFEFFFFFFDFFFFFFF3FBD7F7FFA7763
:10116000FBD7FA57FA77F8AFFFFFFFFFFFFFFFF4C
:10117000E3F7EFE7FFF7FFDFFFDBFF7FFEFAFFFF90
:10118000FFFFFFFFFFFBF7EFF3EFE7FFFFFBD3FFE75
:101190007FFEAFFFFFFFFFFFFFFFFCBFBD587FD0C
:1011A0009FFDDFF9FFBBBFFFCFFFFFFFFFFFFFFF54
:1011B000BFBF7B3D7EFE7E7E7F7E7A76FCEFFFFAB
:1011C000FFDFFFFFFFFF6BF7EBD6E7AFE7E767FF78
:1011D000E5FDFFEFFFFFFFFFFFFFFFFBFFF7803
:1011E000FDBFFE7FBE7FEFFFEFFFFFFFFFFFFFB3
:1011F000FFFFFFFFFF6F8FFFEFFFF77FEF70FDFEFF2C
:10120000FFFFFFFFFFFFFFFFF77FAF2FFFA7FF319
:101210007FBBFFEFFFFFFFFFFFFFFFFFFFFFFF674A
:10122000F77FAF7FE7FFEFFFFFFEFFFFFFFFFFFFF4F
:10123000FFFFFFFFF5FFCBDFFFD7FDE7FFCFFEFFF09
:10124000FFFFFFFFFFFFFFFFFFFA3BFFDBFFFA5E6
:10125000FFBEFFFFFCFFFFFFFFFFFFFFFFFF7F62
:10126000F8F99FFB7FFC7FFADFAEFFFFFFFFFFFF78
:10127000FFFFFFFFFFE7FFFFFFFE7FFFDFFF3FAC1
:10128000FFFFFFFFFFFFFFFFFF7FBDDD7FDD5F94
:10129000FDFFFD7FAFFFFFFFFFFFFFFFFFFFFF32
:1012A0007F7FF6BFFEFFFF3FFF7FEFFFFFFFFF17
:1012B000FFFFFFFFFFF7F5B7B7B7B7B7B7BFBAF52
:1012C000FFFFFFFFFFFFFFFFFFFFFFFFFFFFBF6E
:1012D000FFBBFBF9F7FAFFFFFFFFFFFFFFFFFF79
:1012E000FF7EBF76FF76FFF6BF76AFFFFFFFFFFFF03
:1012F000FFFFFFFFFFFFFE7ED5DFD79FD7FBD7F75C
:10130000FEFFFFFFFFFFFFFFFFFFFF6FFE5F7E7827
:10131000FE7FFE7DFECFFFFFFFFFFFFFFFFFFFFF12
:10132000FFFBEBE7E7E7FFE7DFE7EFFEFFFFFFFF8E
:10133000FFFFFFFFFFFFFBFAF7FB77FAF7FDF771
:10134000AFFFFFFFFFFFFFFFFFFFFFFC7FFFFF35
:10135000FFE7FF9FFFFDFEFFFFFFFFFFFFFFFF18
:10136000FF7FDCFF7FFFFFD7FFDFFFEFFFFFFFF08
:10137000FFFFFFFFFFFFFBFAFFFABFFBFFFDF7F41
:10138000FFFEFFFFFFFFFFFFFFFFFFFFFF7E7E70
:101390007F7E3EFE5FFEEFFFFFFFFFFFFFFFFFD1
:1013A000FFFBE7FFE7EFE7E7A7DE67FFFEFFFFFFD3
:1013B000FFFFFFFFFFFFBFFFFEFFFF7FFEFFBFDF5F
:1013C00079EFFFFFFFFFFFFFFFFFFFFEFFFFFD3
:1013D000FFE7FFFFFFDDF7FEFFFFFFFFFFFFFF60
:1013E000FFFFFFFB7FFA6FEAEFF7FFFFEFFFFFFF63
:1013F000FFFFFFFFFFFFFFFFFFA7FFE7FBFBFF75
:10140000FBFEFEFFFFFFFFFFFFFFFFFFFFEFCF32
:101410008D7FFCF7CDFFFDEFFFFFFFFFFFFFFF10
:10142000FFFFFBD7F9FFDA77FFFFFDFFFFCFFFFEB
:10143000FFFFFFFFFFFFFFFFFFFEDFFFAFDAEFB9A8
:10144000DFDFAEFFFFFFFFFFFFFFFFFFFFFEFFF40
```

```
:10145000FFFFF7FFFFFFFFFFFAFFFFFFFFFFFFFFA9
:10146000FFFFFF7FF9BFDD7FFDFFFFFF7FAFFFFFC6
:10147000FFFFFFFFFFFFFFFFFF7BFF7FFF7FFFFD4
:10148000FBFFF7FEFFFFFFFFFFFFFFFFFFF7F7B7D
:101490007B7B7B7B7B7B7BFBAFFFFFFFFFFFFFFF4C
:1014A000FFFFFFFFFFFFFFFFFFFFBFBFFFFFAFF59
:1014B000FFFFFFFFFFFFFFFFFFF7FFF76FF56FF16D7
:1014C000FF76FAFFFFFFFFFFFFFFFFFFFFFFFD7AD
:1014D00007E7D7D7D7DF9307F7FEFFFFFFFFFFFF91
:1014E000FFFFFFFF7F7FFE7F6E587E78FEBFCFFF3E
:1014F000FFFFFFFFFFFFFFFFFFFF7E7FFE7E7E764
:10150000EFE7EFFEFFFFFFFFFFFFFFFFFFFFFFFF3C
:10151000FBF7FA57FA77FBF7FAAFFFFFFFFFFFFF82
:10152000FFFFFFFFFFFDFFBCFFDC2FFFFFFEFFFE6F
:10153000FFFFFFFFFFFFFFFFFFFFFFFFFFE7BFD42
:101540007FFE7BBFEFFFFFFFFFFFFFFFFFFFFFFF00
:10155000BFFF8FFF8FFFAFFFB7F7FEFFFFFFFFFF5C
:10156000FFFFFFFFFFF7FBFE7B7E7E7E5F0EFFEF68
:10157000FFFFFFFFFFFFFFFFFFFFBF7E7FBE7E7D03
:10158000E7DFE7E7F3FEFFFFFFFFFFFFFFFFFFBF20
:10159000FFFFFF7FD67FBEFFFE6FEEFFFFFFFFFF67
:1015A000FFFFFFFFFFFFFFFFFE7FFE7FFEFFBF797
:1015B000FEFFFFFFFFFFFFFFFFFFFFFFFFA7FBA86
:1015C0007FFB7FBFFEFFFFFFFFFFFFFFFFFFFFFF43
:1015D000FFFBE77FE77FE7FFF3FEFFFEFFFFFFFF75
:1015E000FFFFFFFFFFFFFFFFFFFD7FFD7FFE7FFCFF93
:1015F000EFFFFFFFFFFFFFFFFFFFFFFFFFBF7BAF1F
:10160000FFA7FF9FFFFFFCFFFFFFFFFFFFFFFFFA5
:10161000FFFFFF97FFA7FBC5FDEEFAEFFFFFFFFF4A
:10162000FFFFFFFFFFFFFFFFFFE7FFE5FBFFFF00
:10163000FFFAFFFFFFFFFFFFFFFFFFFF7FFD7FC1
:10164000FD7FFD3BFD77AFFFFFFFFFFFFFFFFFCC
:10165000FFBFFBF7FFF6FB77FFF7FFF7FEFFFFFF8C
:10166000FFFFFFFFFFFFFF7F7B7B5B7B7B7B7BC6
:10167000DBAFFFFFFFFFFFFFFFFFFFFFFFFFFFEE
:10168000FEFFFFFDFBFFFFFAFFFFFFFFFFFFFFFF76
:10169000FFFFFFFFFE76EFB6FEF6FE76AFFFFFFF21
:1016A000FFFFFFFFFFFFFFFFFD7D7D7D7DFD7DF52
:1016B000D3F7FEFFFFFFFFFFFFFFFFFFFFFFE7FEF
:1016C0007E7EDE3EFE78BECFFFFFFFFFFFFFFFFF07
:1016D000FFFFFFFFDFE7C7E7CFE7EFE7EFFEFFFF23
:1016E000FFFFFFFFFFFFFFEFFFFFFB77FBF7FAF7BF
:1016F000FAF7AFFFFFFFFFFFFFFFFFFFFFFFFDF77
:10170000FFCFFFEFFBCFFFFFFEFFFFFFFFFFFFF5E
:10171000FFFFFFFF7FFF7FDE3FFF3FFEBFEFFFFFCB
:10172000FFFFFFFFFFFFFFFFFF8FFF87FDB3FFFF
:10173000A7FFF7FEFFFFFFFFFFFFFFFFFFFFFF1A
:101740007A7E7A7E7F7E5AFEEFFFFFFFFFFFFFFF6C
:10175000FFFFDF7AFFF7E7E367D767C7E7F7FEFF2B
:10176000FFFFFFFFFFFFFFF3FF8FF7FFEDFFEFFF2
:10177000FFFF6FEFFFFFFFFFFFFFFFFFFFFCFFF49
:10178000FFE7FFCFFFFEFFFFF7FEFFFFFFFFFFBB
:10179000FFFFFFFFFBFF7FFA7FFAFFFFFFFFEFFF77
:1017A000FFFFFFFFFFFFFFFF6FFFFFA77FA7FF09
:1017B000FFFBFFFFFEFFFFFFFFFFFFFFFFFFFFFC41
:1017C000FF7FFE7FFCFFBDBFFFEFBFFFFFFFFFFF
:1017D000FFFFFFFB7FFFFA7FF87FF7DFFFFFDFCB8
:1017E000FFFFFFFFFFFFFFFFFF7FF8FF7FFF7FFE91
:1017F000BFF9FFBFAEFFFFFFFFFFFFFFFFFFE7E8
:10180000FFFFEFFFE7FBFFFFFFFFFAFFFFFFFFF19
:10181000FFFFFFEE7FF9FF7FFD7FFDFFFFF7FAF42
:10182000FFFFFFFFFFFFFFFFFFFFF5FFFFF7FFF7E2
:10183000FFFFFFFFF6FEFFFFFFFFFFFFFFFFF5F62
:10184000FB7F7B7B7B7B7BFBFFAFFFFFFFFFFF98
:10185000FFFFFF0FFFFFDFFFFFFFFFFEBFFFFFFDFFFD
:10186000FAFFFFFFFFFFFFFFFFFFFFFEFF76FFF620
:10187000FE56BFF67FCFFFFFFFFFFFFFFFFFDF3B
:10188000E7FFD7D7D3DDD7D7D3BFF7FEFFFFFFF7EB
:10189000FFFFFFFFFF7FFF7F7E76E6E7FDE7EFEFF0E
:1018A000CFFFFFFFFFFFFFFFFFFFFFE7FFE7C7E7F8
:1018B000CFE7EFE7FFEFFEFFFFFFFFFFFFFFFFFFB9
:1018C0007FFAFF77FAF7FAF7FAF7FFAFFFFFFFFAC
:1018D000FDFFFFFFFFFFD7FFFFC7FFF5FEEFFFFF95
:1018E000FFFEFFFFFFFFFFFFFFFFFFF7FFDFF7FFE0C
:1018F000FFFE7BFFFFFFAFFFFFFFFFFFFFFFFFFCD
:10190000FFA7FFFF87FFB7FDB7FFFFF3FAFFFFFF5A
:10191000FFFFFFFFFFFF7FFE7FFE7A7E7F7E7FFE61
:10192000FFCFFFFFFFFFFFFFFFFFFFFFF3FFE7F723
:10193000E7EFE7F7E7FFF6BAFFFFFFFFFFFFFFFF65
:10194000FF3FFCFFFFFFFFEFF7EFEFFEFCFF7FFFF35
:10195000FFFFFFFFFFFFFFAFFFFFFFF7FF77E7FC92
:10196000FFFF3EFDFFFFFFFFFFFFFFFF7FFAEFFFDF
:10197000FFB7F7BFEBFFFEFF3FDFFFFFFFFFFFFDE
:10198000FFFA7FFFFFFBFFFEFE7FFFFFF3EFFDF08
:10199000DFFFFFFFFFFFFF7FECFFFFFFFFF77CFE96
:1019A000FFDFEF93FFFFBFFFFFFFFFFFFF877BFF1F
:1019B000FFBFFEB7E6FFFFFF3CDFFFFFFFFFFFFBC
:1019C000FFFFF7FEFFFF7FFFFF7DFEFFFFAEF3FF90
:1019D000FEFFFFFFFFFFFFFFE7FFFFFFEFFFDDE37F
:1019E000FFFFFFBADEFFFFFFFFFFFFFFDFFFFAFF92
:1019F000FF7FFD7FFDFFFF7FEFFBFFDFFFFFFFFFAF
:101A0000FFFFFFF7BDFBFFF7FFF7FFFFFFF7BCFD91
:101A1000FFFFFFFFFFFFFFFF7FFBFF7F7B7B7BBEA
:101A2000DB7FFBAFFFFFFF7FDFFFFFFFFFFFFFFEFD61
:101A3000FFFBFFFFFFFFFCFFFFBAFFFFFFFFFFFF3E
:101A4000FFFFFFFFFEFFFF76DF76FFF7FF76CFEBAE
:101A5000FFFFFDFFFFFFFFFFFD7FFFD7D7D793A4
:101A600057FFD7F7BEFFFFDFFFFFFFFFFFF7FFE40
:101A7000DF5F7E7FFEFFFF7FFECFF7FFFFFFFFFFF1
:101A8000FFFFFFFEDFFFFE7CFE7DDFFFFE7EF3EE3
:101A9000FDFFFFEFFFFFFFFFFFFEFFAFFFFF7FB7711
:101AA0007AFAFFF7AFC3FFFFFFFFFFFFFFFFFFC79C
:101AB000FFFFFEDFFF87E7FFFFFFF3EFFFFFFDDFDCC
:101AC000FFFFFFDF7FBEFFFFFFFF7F7EBEFF7FAF19
:101AD000C3FDFFFFFEFFFDFFFFFF87FFFFFF9FFF2F
:101AE000A7A3FFFBFF3AFFFFDFFFFFFFFFFFFF7F23
:101AF000FAFF7FFE7A7EFEF77FFECFF3DFBDFFBFEA
:101B0000FDDFFFDFFFE3FFFFE7F7E7E7FFFFE7FBAF
:101B10003AEF3FBFBFFCFFFFFFFFFBF7FBDFFFFFFEF
:101B2000FFFDFFFFFCEF3FFF777EBFFFFFFFFFFC6
:101B3000FF37FFFFFFFDFF7FFFFFB7EF93FFDFD4E
:101B4000FDFFFFFFFFFFFFFBFFFFFBBFFFFFFFEF
:101B5000EFFBFFF3BFFFFFFFBFFFFFFFFFFFFF35
:101B6000FFFDFFFFFBFF3EEF2FFFFFFFFFFFFFFF2C
```

```
:101B70000F9FFFFFFF7FFBFFFFFFFFFFEF93FFD3DF3F
:101B80009FFFFFFFFFFFF7FBFFFFFFFAFFFFFFFFFD5
:101B9000FF3CFF7F7FBFFFFFFFFFFFFF7FDFFFEF08
:101BA000FFFCFFFFFEFFFAEF3FFF2FAFBFFFFFFFFCB
:101BB000FFFFF7FFFFFFD7FFFFFFFFFF7BAFEBFBE34
:101BC0009EFEFFFFFFFFFF5FF9BFFF7FDDDFBFFF6F
:101BD0007FEFFBFFFBFBDBFEFFFDFFFFBFF7FFFD22
:101BE000FFF77FFFFEFFFFBCFDBFBDBDFDFFFFFF99
:101BF000FFFF7F7BFB7F7B7BFB7FFBFFAEFFFFFF5E
:101C0000FFFF7FFFFFFFFFFFFFFFFFFFFFFFFFFF64
:101C1000FFF7BAFFBF9FBFFFFFFFFFFFFF7F9FF6EA
:101C2000FF76FFF6FFF66FCFEBFFEBEBEBFFFFFF6F
:101C3000FF7FFFD7D7FBD7D7D7FFD7BFEF3EFF3FF9
:101C40007F5FFFFFFFFFFFF7BF7FEE5F7E7FFE7FBF
:101C5000FEFFCFE3FFFAEBF7FFFFFFFFFFFFFFE71A
:101C6000FFE7EFE7FFE7FFEF76FD1FFDFDFDFFFF5D
:101C7000FFFFFFFFFAF7FFF7FAF7FFF7FF8FCBFF42
:101C8000E3EFEDFFFFFFFFFFFDCFFFFFFFFF7FBFFE0
:101C9000FFFFFF3EFF3DFDFFFFFFFFFFFFFFFF8E0
:101CA000FFFFFFFFFFFFFFFAFC3FDC3CECFFFFF6F
:101CB000FFFFFFFFAFFFFFFFBFFFFFFFFFFF73AFF91
:101CC000BFBD7DFDFFFFFFFFFFFF7FFE7FFE7FFEAD
:101CD0007FFEFFCFF3DDF1B7F7FFFFFFFFFFBBFF9b
:101CE000E7FFE7FFE7FFE7FFF7BABF3F3F3FFFFF31
:101CF0003FFFFF3FFCAFFFFFFFFFFFEFFFFFCFF313
:101D0000F6F3F3FFFFF3FFFFA5FFFFFBFFFFFF7A
:101D1000FFFFFEFF3E3D7D3D3DFDFF3FFFFF5FBE00
:101D2000FFFFFFFFFFFFFFFFFFEFF3F3F2F3D3DF50
:101D3000FFF3FF7FE7FFFFFFFFFFFFFFFFFFFF3E18
:101D40003F3EBF7FFEFF3FFDFF7FF8FFFFFFFFFF2E
:101D5000BFEFFFEFEFD3D3D6D3CB7FFFF3FFFFE788
:101D6000FFFFFFFFEFFFFFFFFFFF3C3F1D3F3FFE6A
:101D7000FF3FFFFF7FE8FFFFFFFFFFFFFFFFFAE1B
:101D8000FBF3F3FBF3FFFFF3FFFFE77FFFFFFFFF33
:101D9000FBFFFFFFF7FABEFE9EBEFCFFFFFFFFFF4B
:101DA000FFFBFFFFFFFFFF7FFFF7FEFFBFBFBFBFBF3
:101DB000FFFFFFFF7FFFDFFFFFFFFFFFFFEFFF7DC
:101DC000BCBDBDBDBDFDFFBFFDFF7F7DF37FFB7FC6
:101DD000FB7FFB7FFBAFFFFFFFFFFFFDFFFFFFF9F
:101DE000FFFFFFFFFFFFFFFFFFFF7BABFBFBFBF50
:101DF000FFFD7FBFFFF7FFFFFF6FFF6FFF6FF5663
:101E0000AFEFEBEFEBE9FFFFBFFFFF97D7FFD7FF88
:101E1000D7FFD7FFD7FF3E3FBE3EBEFEFFFFFFFF0F
:101E2000FE7FFC7FFE7FFE7FFE7FEECFE7E3F3F3D3
:101E3000E7FFFFFFFFFFDFE7FFE7FFE7FFE7FFE762
:101E4000ED3E3D3C3C3CFCFFFFFFFFFFFBFFFFB7CF
:101E5000FFF7FFF7FFF7AFF3F1F3F3E37FFFFFFFC8
:101E6000FFFFDFFFFFFFFFFFFFFFFFFF3E3F1F1FE3
:101E70003FFFFFFFFFFFFFFFFDFFFFFFFFFFFFFF34
:101E8000DFEFD3D1C3D7C3FFFFFFFFFFBFFFFFFFCC
:101E9000FFFFFBFFFFFFFD7CBE3F7F3FFDFFFFFF1E
:101EA000FFFF7FFE7FFE7FFE7FFE7FFEEFF3F7CB1F
:101EB000F3D3FFFFFFFFFFEBE7FFE7FFE7FFE7FFDE
:101EC000E7FFBEDF9DDC9FFFFFFFFFFFBFFFEBFFD4
:101ED0007F7FBF7FBDFFFFEFDFFFFFF9DBDBD7CFEA
:101EE000DFDFBFBFBFB7B7FF97F7BBB7FFBCDCFDFG
:101EF000FDDDFDBDBDBDBD7D7B7B7BFBFBF9FB7BC4
:101F00007BBBEFF7D5D5D5F1F5F5D5D5F5EDEBAB39
:101F1000EBA3ABA8ABABABFBFE7E5F7F7F777F7F93
:101F20007F7FFFFEFF7E7DFE3EFEFEFEDFEFF3F7CE
:101F3000F7F7F7F7F7F7F7AFEFEFE7EFEFEFEFB9
:101F4000EFE7FFFFEFFDFDFFFFFFFFFFFFFFFFF0A
:0A1F5000FFEFFFBFFFBFFFFFFFFFF21
:00000001FF
```

1. A method of operating a non-volatile memory system to prevent excessive downloading of data from a volatile SRAM into an E²PROM in response to short duration power interruptions, comprising the steps of:
   (a) writing data into the SRAM by means of a host computer, and then performing read and/or write memory accesses to the SRAM while an external power supply voltage is applied to the non-volatile memory system;
   (b) charging a backup capacitor to a selected voltage level and maintaining the selected voltage level while the external power supply voltage is applied to the non-volatile memory system;
   (c) halting accessing of the SRAM by the host computer while discharging the backup capacitor to supply energy to maintain a data maintenance voltage on the SRAM if the external power supply voltage falls below a first threshold;
   (d) resuming accessing of the SRAM by the host computer if the external power supply voltage rises above the first threshold before the backup capacitor voltage falls below a second threshold;
   (e) downloading all of the data in the SRAM to the E²PROM while discharging the backup capacitor to supply energy to maintain an internal power supply voltage necessary for the downloading if the backup capacitor voltage falls below the second threshold,
   the backup capacitor storing enough energy when the backup capacitor voltage is at the selected level to both effectuate the downloading and allow the halted condition to continue for at least a preselected time.

2. The method of claim 1 including charging the backup capacitor by means of a voltage up converter to increase the amount of backup energy storage, and discharging current from the backup capacitor by means of a voltage down converter circuit to supply the internal supply voltage.

3. The method of claim 1 including removing power from the E²PROM during the read and/or write memory accesses by the host computer and maintaining the data maintenance voltage at a reduced level substantially less than a normal operating voltage of the SRAM while accessing of the SRAM is halted.

4. The method of claim 2 wherein the selected level of the backup capacitor voltage is approximately 100 volts and the first threshold is approximately 85 volts.

5. The method of claim 1 wherein the preselected time is at least approximately one minute.

6. The method of claim 1 including uploading data from the E²PROM to the SRAM if the external power supply voltage rises above the first threshold and the backup capacitor voltage rises above the second threshold.

7. The method of claim 6 including accumulating row parity information and column parity information and comparing it with previously stored row parity information and column parity information in the E²PROM and using results of the comparing to correct the data and storing the corrected data in the SRAM during the uploading.

8. The method of claim 7 wherein the SRAM includes a plurality of integrated circuit SRAMs and a plurality of integrated circuit E²PROMs, the method including subdividing each integrated circuit SRAM into a plurality of subsections and subdividing the integrated circuit E²PROMs into corresponding subsections, the downloading including
  (i) reading data in words in a first subsection of a first integrated circuit SRAM and transferring the read data into a corresponding subsection of a first integrated circuit E²PROM and also transferring the read data into corresponding word locations of a row parity accumulator and also into a column parity accumulator;
  (ii) reading data in words in a first subsection of a second integrated circuit SRAM and exclusive ORing each bit of that first subsection with a corresponding bit of the row parity accumulator and storing the result into a corresponding bit location of the row parity accumulator and exclusive ORing each bit of that first subsection with a corresponding bit of the column parity accumulator and storing the result in that corresponding bit location of the column parity accumulator;
  (iii) repeating step (ii) for the first subsection of each remaining integrated circuit SRAM;
  (iv) transferring the contents of the row parity accumulator and the column parity accumulator into the E²PROM.

9. The method of claim 8 wherein the uploading includes:
  (1) reading data in words in a first subsection of the first integrated circuit E²PROM and transferring that read data into the first subsection of the SRAM and also transferring that read data into corresponding word locations of the row parity accumulator and into the column parity accumulator;
  (2) reading data in words in a first subsection of a second integrated circuit E²PROM and exclusive ORing each bit with a corresponding bit of the row parity accumulator and storing the result into a corresponding bit location of the row parity accumulator, and also exclusively ORing that bit with a corresponding bit of the column parity accumulator and storing the result into a corresponding bit location of the column parity accumulator;
  (3) repeating step (2) for the first subsection of each remaining integrated circuit E²PROM;
  (4) comparing the row parity data in the row parity accumulator with corresponding row parity data previously stored in the E²PROM and comparing column parity data in the column parity accumulator with column parity data previously stored in the E²PROM if a mismatch occurs, and exclusively ORing an error pattern produced from the row parity data and column parity data with corresponding data transferred from the EPROM to the SRAM to produce corrected data and writing the corrected data into the SRAM.

10. The method of claim 9 including repeating steps (i) through (iv) and steps (1) through (4) for each subsection of the integrated circuit SRAMs and each subsection of the integrated circuit E²PROMs.

11. A non-volatile memory system including means for preventing excessive downloading of data from a volatile SRAM into an E²PROM in response to short duration power interruptions, the non-volatile memory system comprising in combination:
  (a) means for writing data into and reading data from the SRAM in response to a host computer;
  (b) means for enabling the host computer to continue to perform read and/or write memory accesses to the SRAM while an external power supply voltage is applied to the non-volatile memory system;
  (c) a backup capacitor
  (d) means for charging a voltage of the backup capacitor to a selected level and maintaining the selected level while the external power supply voltage is applied to the non-volatile memory system;
  (e) means for halting accessing of the SRAM by the host computer if the external power supply voltage falls below a first threshold;
  (f) means for discharging the backup capacitor to supply energy to maintain a data maintenance voltage on the SRAM if the external power supply voltage falls below the first threshold;
  (g) means for resuming accessing of the SRAM by the host computer if the external power supply voltage rises above the first threshold before the backup capacitor voltage falls below a second threshold;
  (h) means for downloading all of the data in the SRAM to the E²PROM while discharging the backup capacitor to supply energy to maintain an internal power supply voltage needed for the downloading if the backup capacitor voltage falls below the second threshold, the backup capacitor storing enough energy when the backup capacitor voltage is at the selected level to both effectuate the downloading and allow the halted condition to continue for at least a preselected time.

12. The non-volatile memory system of claim 11 wherein the backup capacitor charging means includes a voltage up converter to increase the amount of backup energy storage, and the backup capacitor discharging means including a voltage down converter circuit discharging current from the backup capacitor to supply the internal power supply voltage.

13. The non-volatile memory system of claim 11 including means for removing power from the E²PROM during the read and/or write memory accesses by the host computer, and including means for maintaining the data maintenance voltage at a reduced level substantially less than a normal operating voltage of the SRAM.

14. The non-volatile memory system of claim 12 wherein the selected level of the backup capacitor voltage is approximately 100 volts and the first threshold is approximately 85 volts.

15. The non-volatile memory system of claim 11 wherein the preselected time is at least approximately one minute.

16. The non-volatile memory system of claim 11 including means for uploading data from the E²PROM to the SRAM if the external power supply voltage rises above the first threshold and the backup capacitor voltage rises above the second threshold.

17. The non-volatile memory system of claim 16 including means for accumulating row parity information and column parity information and means for comparing the accumulated row parity information and the column parity information with previously stored row parity information and column parity information, respectively, in the E²PROM, and means for correcting the data in response to the comparing, and means for storing the corrected data in the SRAM during the uploading.

18. A method of operating a non-volatile memory system to prevent excessive downloading of data from a volatile RAM into a non-volatile backup memory in response to short duration power interruptions, comprising the steps of:
  (a) writing data into the RAM by means of a host computer and then performing read and/or write memory accesses to the RAM while an external power supply voltage is applied to the non-volatile memory system;
  (b) providing a backup voltage source supplying a backup voltage of a selected level and maintaining the selected level while the external power supply voltage is applied to the non-volatile memory system;
  (c) halting accessing of the RAM by the host computer while discharging the backup voltage source to supply energy to maintain a data maintenance voltage on the RAM if the external power supply voltage falls below a first threshold;
  (d) resuming accessing of the RAM by the host computer if the external power supply voltage rises above the first threshold before the backup voltage falls below a second threshold;
  (e) downloading all of the data in the RAM to the non-volatile backup memory while discharging the backup voltage source to supply energy to maintain an internal power supply voltage necessary for the downloading if the backup voltage falls below the second threshold,
  the backup voltage source storing enough energy to both effectuate the downloading and allow the halted condition to continue for at least a preselected time.

19. The method of claim 18 including uploading data from the E²PROM to the SRAM if the external power supply voltage rises above the first threshold and the backup capacitor voltage rises above the second threshold, and accumulating row parity information and column parity information and comparing it with previously stored row parity information and column parity information in the non-volatile backup memory and using results of the comparing to correct the data and storing the corrected data in the RAM during the uploading.

20. The method of claim 19 including storing a key word into a non-volatile, eraseable key register, encrypting data being downloaded from the RAM into the non-volatile memory using the stored key word, and decrypting data being uploaded from the non-volatile memory to the RAM using the key word, and erasing the key word from the key register to allow the data downloaded to be declassified.

21. A non-volatile memory system including means for preventing excessive downloading of data from a volatile RAM into a non-volatile backup memory, in response to short duration power interruptions, the non-volatile memory system comprising in combination:
  (a) means for writing data into and reading data from the RAM in response to a host computer;
  (b) means for enabling the host computer to continue to perform read and/or write memory accesses to the RAM while an external power supply voltage is applied to the non-volatile memory system;
  (c) a backup voltage source supplying a backup voltage;
  (d) means for halting accessing of the RAM by the host computer if the external power supply voltage falls below a first threshold;
  (e) means for discharging the backup voltage source to supply energy to maintain a data maintenance voltage on the RAM if the external power supply voltage falls below the first threshold;
  (f) means for resuming accessing of the RAM by the host computer if the external power supply voltage rises above the first threshold before the backup voltage falls below a second threshold;
  (g) means for downloading all of the data in the RAM to the non-volatile backup memory while discharging the backup voltage source to supply energy to maintain an internal power supply voltage needed for the downloading if the backup voltage falls below the second threshold, the backup voltage source storing enough energy to both effectuate the downloading and allow the halted condition to continue for at least a preselected time.

22. The non-volatile memory system of claim 21 including means for uploading data from the non-volatile backup memory to the RAM if the external power supply voltage rises above the first threshold and the backup voltage rises above the second threshold.

23. The non-volatile memory system of claim 22 including an eraseable register storing a key word, and encryption/decryption means coupled to the eraseable register for encrypting data being downloaded from the RAM into the non-volatile memory using the key word and decrypting data being uploaded from the non-volatile memory into the RAM using the key word, and means coupled to the eraseable register for rapidly erasing the key word from the eraseable register in response to a user command.

24. The non-volatile memory system of claim 23 wherein the eraseable register is a 56-bit ferrite core register.

* * * * *